United States Patent
Lauer et al.

(10) Patent No.: US 8,254,914 B2
(45) Date of Patent: *Aug. 28, 2012

(54) SYSTEM FOR CREATING AN AIR-TO-GROUND IP TUNNEL IN AN AIRBORNE WIRELESS CELLULAR NETWORK TO DIFFERENTIATE INDIVIDUAL PASSENGERS

(75) Inventors: Bryan A. Lauer, Hinckley, IL (US); Jerry Stamatopoulos, North Aurora, IL (US); Anjum Rashid, Bloomingdale, IL (US); Joseph Alan Tobin, Chicago, IL (US); Patrick J. Walsh, Naperville, IL (US); Steven J. Arntzen, Dixon, IL (US)

(73) Assignee: Gogo, LLC, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/227,634

(22) Filed: Sep. 8, 2011

(65) Prior Publication Data

US 2011/0320576 A1 Dec. 29, 2011

Related U.S. Application Data

(63) Continuation of application No. 12/060,674, filed on Apr. 1, 2008, which is a continuation-in-part of application No. 11/492,545, filed on Jul. 24, 2006, now Pat. No. 7,751,815, which is a continuation of application No. 10/730,329, filed on Dec. 7, 2003, now Pat. No. 7,113,780, which is a continuation-in-part of application No. 09/686,923, filed on Oct. 11, 2000, now Pat. No. 6,788,935, which is a continuation-in-part of application No. 09/379,825, filed on Aug. 24, 1999, now Pat. No. 6,408,180, which is a continuation-in-part of application No. 08/960,183, filed on Oct. 29, 1997, now Pat. No. 6,108,539, which is a continuation-in-part of application No. 08/709,417, filed on Sep. 6, 1996, now Pat. No. 5,878,346, which is a continuation-in-part of application No. 07/847,920, filed on Mar. 6, 1992, now Pat. No. 5,557,656, and a continuation-in-part of application No. 08/027,333, filed on Mar. 8, 1993, now Pat. No. 5,444,762.

(51) Int. Cl.
 *H04W 4/00* (2009.01)
 *H04B 1/034* (2006.01)
(52) U.S. Cl. .......................................... 455/431; 455/98
(58) Field of Classification Search .................. 455/431, 455/98, 445, 188.1, 404.1; 370/338, 331, 370/323, 313, 401, 316; 701/1, 14; 725/76, 725/105
See application file for complete search history.

(56) References Cited

U.S. PATENT DOCUMENTS 3,659,085 A 4/1972 Potter et al.
(Continued)

FOREIGN PATENT DOCUMENTS

WO WO-0146822 A1 6/2001
(Continued)

OTHER PUBLICATIONS

In the US Patent and Trademark Office in re: U.S. Appl. No. 07/847,920, Final Office Action dated Aug. 22, 1995, number of pages unknown.
(Continued)

*Primary Examiner* — Kiet Doan
(74) *Attorney, Agent, or Firm* — Patton Boggs LLP

(57) ABSTRACT

The Aircraft Air-To-Ground IP Tunnel System provides wireless communication services to passengers located onboard an aircraft by storing data indicative of the individually identified passenger wireless devices located onboard the aircraft. The Aircraft Air-To-Ground IP Tunnel System assigns a single IP address to each Point-to-Point Protocol link connecting the aircraft network to the ground-based communication network and creates an IP subnet onboard the aircraft. The IP subnet utilizes a plurality of IP addresses for each Point-to-Point link, enabling each passenger wireless device to be uniquely identified with their own IP address. This is enabled since both Point-to-Point Protocol IPCP endpoints have pre-defined IP address pools and/or topology configured, so each Point-to-Point Protocol endpoint can utilize a greater number of IP addresses than one per link. Such an approach does not change IPCP or other EVDO protocols/messaging but allows this address to be directly visible to the ground-based communication network.

14 Claims, 8 Drawing Sheets

U.S. PATENT DOCUMENTS

| | | |
|---|---|---|
| 4,115,777 A | 9/1978 | Taylor |
| 4,654,867 A | 3/1987 | Labedz et al. |
| 5,042,027 A | 8/1991 | Takase et al. |
| 5,123,112 A | 6/1992 | Choate |
| 5,134,709 A | 7/1992 | Bi et al. |
| 5,212,804 A | 5/1993 | Choate |
| 5,408,515 A | 4/1995 | Bhagat et al. |
| 5,432,841 A | 7/1995 | Rimer |
| 5,459,469 A | 10/1995 | Schuchman et al. |
| 5,519,761 A | 5/1996 | Gilhousen |
| 5,543,779 A | 8/1996 | Aspesi et al. |
| 5,555,444 A | 9/1996 | Diekelman et al. |
| 5,590,395 A | 12/1996 | Diekelman |
| 5,651,050 A | 7/1997 | Bhagat et al. |
| 5,659,304 A | 8/1997 | Chakraborty |
| 5,678,174 A | 10/1997 | Tayloe |
| 5,740,535 A | 4/1998 | Rune |
| 5,754,959 A | 5/1998 | Ueno et al. |
| 5,805,683 A | 9/1998 | Berberich, Jr. |
| 5,826,188 A | 10/1998 | Tayloe et al. |
| 5,832,380 A | 11/1998 | Ray et al. |
| 5,848,359 A | 12/1998 | Furtaw |
| 5,887,258 A | 3/1999 | Lemozit et al. |
| 5,950,129 A | 9/1999 | Schmid et al. |
| 5,956,644 A | 9/1999 | Miller et al. |
| 5,970,395 A | 10/1999 | Weiler et al. |
| 5,995,805 A | 11/1999 | Ogasawara et al. |
| 5,995,833 A | 11/1999 | Zicker |
| 6,002,944 A | 12/1999 | Beyda |
| 6,009,330 A | 12/1999 | Kennedy, III et al. |
| 6,040,781 A | 3/2000 | Murray |
| 6,055,425 A | 4/2000 | Sinivaara |
| 6,104,926 A | 8/2000 | Hogg et al. |
| 6,144,338 A | 11/2000 | Davies |
| 6,195,529 B1 | 2/2001 | Linz et al. |
| 6,201,797 B1 * | 3/2001 | Leuca et al. ............... 370/316 |
| 6,233,448 B1 | 5/2001 | Alperovich et al. |
| 6,263,206 B1 | 7/2001 | Potochniak et al. |
| 6,304,762 B1 | 10/2001 | Myers et al. |
| 6,314,286 B1 | 11/2001 | Zicker |
| 6,321,084 B1 | 11/2001 | Horrer |
| 6,324,398 B1 | 11/2001 | Lanzerotti et al. |
| 6,353,734 B1 | 3/2002 | Wright et al. |
| 6,392,692 B1 | 5/2002 | Monroe |
| 6,393,281 B1 | 5/2002 | Capone et al. |
| 6,418,327 B1 | 7/2002 | Carey et al. |
| 6,430,412 B1 | 8/2002 | Hogg et al. |
| 6,519,266 B1 | 2/2003 | Manning et al. |
| 6,545,601 B1 | 4/2003 | Monroe |
| 6,567,408 B1 | 5/2003 | Li et al. |
| 6,577,419 B1 | 6/2003 | Hall et al. |
| 6,580,915 B1 | 6/2003 | Kroll |
| 6,614,774 B1 | 9/2003 | Wang |
| 6,615,052 B1 | 9/2003 | Parmenter |
| 6,643,496 B1 | 11/2003 | Shimoyama et al. |
| 6,690,928 B1 | 2/2004 | Konishi et al. |
| 6,700,902 B1 | 3/2004 | Meyer |
| 6,735,438 B1 | 5/2004 | Sabatino |
| 6,735,500 B2 | 5/2004 | Nicholas et al. |
| 6,741,841 B1 | 5/2004 | Mitchell |
| 6,754,489 B1 | 6/2004 | Roux |
| 6,757,712 B1 | 6/2004 | Bastian et al. |
| 6,760,778 B1 | 7/2004 | Nelson et al. |
| 6,788,935 B1 | 9/2004 | McKenna et al. |
| 6,795,408 B1 | 9/2004 | Hiett |
| 6,799,037 B1 | 9/2004 | Mielke et al. |
| 6,810,527 B1 | 10/2004 | Conrad et al. |
| 6,880,750 B2 | 4/2005 | Pentel |
| 6,889,042 B2 | 5/2005 | Rousseau et al. |
| 6,910,628 B1 | 6/2005 | Sehr |
| 6,937,597 B1 | 8/2005 | Rosenberg et al. |
| 6,948,003 B1 | 9/2005 | Newman et al. |
| 6,963,292 B1 | 11/2005 | White |
| 7,003,293 B2 | 2/2006 | D'Annunzio |
| 7,027,801 B1 | 4/2006 | Hall et al. |
| 7,050,755 B2 | 5/2006 | Kline |
| 7,062,268 B2 | 6/2006 | McKenna |
| 7,107,062 B2 | 9/2006 | Cruz et al. |
| 7,131,136 B2 | 10/2006 | Monroe |
| 7,280,535 B1 | 10/2007 | Bergman et al. |
| RE40,476 E | 9/2008 | Leuca et al. |
| 7,433,836 B1 | 10/2008 | August et al. |
| 7,447,804 B2 | 11/2008 | Koo |
| 7,486,690 B2 | 2/2009 | Maeda |
| 7,526,762 B1 | 4/2009 | Astala et al. |
| 7,599,691 B1 * | 10/2009 | Mitchell ................. 455/431 |
| 2002/0010633 A1 | 1/2002 | Brotherston |
| 2002/0045444 A1 | 4/2002 | Usher et al. |
| 2002/0059614 A1 | 5/2002 | Lipsanen et al. |
| 2002/0082912 A1 | 6/2002 | Batachia et al. |
| 2002/0090931 A1 | 7/2002 | Papineau et al. |
| 2002/0123344 A1 | 9/2002 | Criqui et al. |
| 2002/0155833 A1 | 10/2002 | Borel |
| 2003/0032426 A1 | 2/2003 | Gilbert et al. |
| 2003/0046118 A1 | 3/2003 | O'Donnell |
| 2003/0046701 A1 | 3/2003 | O'Donnell |
| 2003/0050746 A1 | 3/2003 | Baiada et al. |
| 2003/0055975 A1 | 3/2003 | Nelson et al. |
| 2003/0084108 A1 | 5/2003 | Syed |
| 2003/0093187 A1 | 5/2003 | Walker |
| 2003/0100315 A1 | 5/2003 | Rankin |
| 2003/0103521 A1 | 6/2003 | Raphaeli et al. |
| 2003/0109245 A1 | 6/2003 | McCalmont et al. |
| 2004/0063433 A1 | 4/2004 | Garrison |
| 2004/0102188 A1 | 5/2004 | Boyer et al. |
| 2004/0137840 A1 | 7/2004 | La Chapelle et al. |
| 2004/0142658 A1 | 7/2004 | McKenna et al. |
| 2004/0152446 A1 | 8/2004 | Saunders et al. |
| 2004/0203918 A1 | 10/2004 | Moriguchi et al. |
| 2005/0053026 A1 | 3/2005 | Mullan et al. |
| 2005/0071076 A1 | 3/2005 | Baiada et al. |
| 2005/0216938 A1 | 9/2005 | Brady et al. |
| 2005/0220055 A1 | 10/2005 | Nelson et al. |
| 2005/0221875 A1 | 10/2005 | Grossman et al. |
| 2006/0009262 A1 | 1/2006 | Hamm |
| 2006/0048196 A1 | 3/2006 | Yau |
| 2006/0064746 A1 | 3/2006 | Aaron et al. |
| 2006/0229070 A1 | 10/2006 | de La Chapelle et al. |
| 2007/0021117 A1 | 1/2007 | McKenna et al. |
| 2007/0042772 A1 | 2/2007 | Salkini et al. |
| 2007/0064604 A1 | 3/2007 | Chen et al. |
| 2007/0087756 A1 | 4/2007 | Hoffberg |
| 2007/0105600 A1 | 5/2007 | Mohanty et al. |
| 2007/0111725 A1 | 5/2007 | Kauffman et al. |
| 2007/0161347 A1 | 7/2007 | Ma et al. |
| 2007/0274294 A1 | 11/2007 | Sasaki et al. |
| 2007/0281682 A1 | 12/2007 | Raju et al. |
| 2008/0039076 A1 | 2/2008 | Ziarno et al. |
| 2008/0070601 A1 | 3/2008 | Brueckheimer et al. |
| 2008/0090546 A1 | 4/2008 | Dickinson et al. |
| 2009/0016339 A1 | 1/2009 | Tanizawa et al. |
| 2009/0080368 A1 | 3/2009 | Bengeult et al. |

FOREIGN PATENT DOCUMENTS

| | | |
|---|---|---|
| WO | WO-2006128946 A1 | 12/2006 |
| WO | WO-2008048742 A1 | 4/2008 |

OTHER PUBLICATIONS

In the US Patent and Trademark Office in re: U.S. Appl. No. 07/847,920, Final Office Action dated Mar. 21, 1996.

In the US Patent and Trademark Office in re: U.S. Appl. No. 07/847,920, Non-Final Office Action dated Feb. 27, 1995, number of pages unknown; and corresponding response dated May 24, 1995.

In the US Patent and Trademark Office in re: U.S. Appl. No. 07/847,920, Non-Final Office Action dated Jan. 27, 1994.

In the US Patent and Trademark Office in re: U.S. Appl. No. 07/847,920, Non-Final Office Action dated Jul. 30, 1993.

In the US Patent and Trademark Office in re: U.S. Appl. No. 08/027,333, Non-Final Office Action dated Jun. 24, 1994.

In the US Patent and Trademark Office in re: U.S. Appl. No. 08/709,417, Final Office Action dated Jun. 11, 1998.

In the US Patent and Trademark Office in re: U.S. Appl. No. 08/709,417, Non-Final Office Action dated Feb. 18, 1998.

In the US Patent and Trademark Office in re: U.S. Appl. No. 08/960,183, Non-Final Office Action dated Nov. 5, 1999.

In the US Patent and Trademark Office in re: U.S. Appl. No. 09/379,825, Non-Final Office Action dated May 11, 2001.
In the US Patent and Trademark Office in re: U.S. Appl. No. 09/686,923, Final Office Action dated Dec. 2, 2003.
In the US Patent and Trademark Office in re: U.S. Appl. No. 09/686,923, Non-Final Office Action dated Jul. 8, 2003.
In the US Patent and Trademark Office in re: U.S. Appl. No. 10/730,329, Final Office Action dated Nov. 25, 2005, 16 pages.
In the US Patent and Trademark Office in re: U.S. Appl. No. 10/730,329, Non-Final Office Action dated May 18, 2005, 9 pages.
In the US Patent and Trademark Office in re: U.S. Appl. No. 11/414,873, Non-Final Office Action dated Oct. 15, 2009, 7 pages.
In the US Patent and Trademark Office in re: U.S. Appl. No. 11/492,545, Final Office Action dated Dec. 19, 2008, 18 pages.
In the US Patent and Trademark Office in re: U.S. Appl. No. 11/492,545, Final Office Action dated Nov. 19, 2009, 19 pages.
In the US Patent and Trademark Office in re: U.S. Appl. No. 11/492,545, Non-Final Office Action dated Aug. 7, 2008, 19 pages.
In the US Patent and Trademark Office in re: U.S. Appl. No. 11/492,545, Non-Final Office Action dated Jun. 10, 2009, 20 pages.
In the US Patent and Trademark Office in re: U.S. Appl. No. 11/590,146, Final Office Action dated Mar. 31, 2009, 9 pages.
In the US Patent and Trademark Office in re: U.S. Appl. No. 11/590,146, Non-Final Office Action dated Sep. 24, 2008, 12 pages.
In the US Patent and Trademark Office in re: U.S. Appl. No. 12/021,125, Non-Final Office Action dated Jun. 10, 2010, 12 pages.
In the US Patent and Trademark Office in re: U.S. Appl. No. 12/021,133, Non-Final Office Action dated Jun. 18, 2009, 14 pages.
In the US Patent and Trademark Office in re: U.S. Appl. No. 12/021,169, Final Office Action dated Apr. 21, 2011, 12 pages.
In the US Patent and Trademark Office in re: U.S. Appl. No. 12/021,169, Final Office Action dated Jun. 8, 2010, 8 pages.
In the US Patent and Trademark Office in re: U.S. Appl. No. 12/021,169, Non-Final Office Action dated Jan. 15, 2010, 8 pages.
In the US Patent and Trademark Office in re: U.S. Appl. No. 12/021,169, Non-Final Office Action dated Jul. 14, 2009, 10 pages.
In the US Patent and Trademark Office in re: U.S. Appl. No. 12/021,169, Non-Final Office Action dated Nov. 10, 2010, 10 pages.
In the US Patent and Trademark Office in re: U.S. Appl. No. 12/029,298, Final Office Action dated Nov. 23, 2010, 11 pages.
In the US Patent and Trademark Office in re: U.S. Appl. No. 12/029,298, Non-Final Office Action dated Jun. 22, 2010, 11 pages.
In the US Patent and Trademark Office in re: U.S. Appl. No. 12/060,645, Final Office Action dated Apr. 4, 2011, 13 pages.
In the US Patent and Trademark Office in re: U.S. Appl. No. 12/060,645, Non-Final Office Action dated Nov. 3, 2010, 19 pages.
In the US Patent and Trademark Office in re: U.S. Appl. No. 12/060,662, Final Office Action dated Apr. 4, 2011, 20 pages.
In the US Patent and Trademark Office in re: U.S. Appl. No. 12/060,662, Non-Final Office Action dated Nov. 18, 2010, 26 pages.
In the US Patent and Trademark Office in re: U.S. Appl. No. 12/060,674, Final Office Action dated Apr. 5, 2011, 19 pages.
In the US Patent and Trademark Office in re: U.S. Appl. No. 12/060,674, Final Office Action dated Jan. 15, 2010, 11 pages.
In the US Patent and Trademark Office in re: U.S. Appl. No. 12/060,674, Non-Final Office Action dated Jul. 9, 2009, 14 pages.
In the US Patent and Trademark Office in re: U.S. Appl. No. 12/060,674, Non-Final Office Action dated Nov. 22, 2010, 13 pages.
In the US Patent and Trademark Office in re: U.S. Appl. No. 12/137,995, Non-Final Office Action dated Jul. 27, 2011, 14 pages.
In the US Patent and Trademark Office in re: U.S. Appl. No. 12/182,834, Final Office Action dated Nov. 20, 2009, 8 pages.
In the US Patent and Trademark Office in re: U.S. Appl. No. 12/182,834, Non-Final Office Action dated Feb. 8, 2011, 8 pages.
In the US Patent and Trademark Office in re: U.S. Appl. No. 12/182,834, Non-Final Office Action dated Jul. 8, 2009, 13 pages.
In the US Patent and Trademark Office in re: U.S. Appl. No. 12/423,555, Final Office Action dated Mar. 24, 2010, 9 pages.
In the US Patent and Trademark Office in re: U.S. Appl. No. 12/423,555, Non-Final Office Action dated Nov. 10, 2009, 7 pages.
Casewell, I.E.; "The Provision of GSM Cellular Radio Environments With Passenger Aircraft Operating Over Europe"; IEEE Fifth International Conference; Dec. 11-14, 1989; pp. 172-176.
International Search Report issued Dec. 29, 2009 in co-pending application PCT/US09/036158.
International Search Report issued Jul. 17, 2009 in co-pending application PCT/US2009/042788.
International Search Report issued Nov. 6, 2009 in co-pending application PCT/US2009/036155.
Li et al.; "Airborne Operation of Portable Electronic Devices"; IEEE Antenna's and Propagation Magazine; vol. 44, No. 4; Aug. 2002; pp. 30-39.
Papavramidis et al.; "Adaptation of Land Mobile Systems for Onboard Operation"; IEEE Conference; 1993; pp. 258-263.
Uhlirz; "Concept of a GSM-based Communication System for High-Speed Trains"; 1994 IEEE 44th Vehicular Technology Conference; Stockholm; Jun. 8-10, 1994; pp. 1130-1134.
In the US Patent and Trademark Office in re: U.S. Appl. No. 11/590,146, Final Office Action dated Mar. 15, 2010, 18 pages.
In the US Patent and Trademark Office in re: U.S. Appl. No. 11/590,146, Non-Final Office Action dated Sep. 15, 2009, 16 pages.
In the US Patent and Trademark Office in re: U.S. Appl. No. 12/137,995, Final Office Action dated Nov. 30, 2011, 17 pages.

* cited by examiner

SYSTEM FOR CREATING AN AIR-TO-GROUND IP TUNNEL IN AN AIRBORNE WIRELESS CELLULAR NETWORK TO DIFFERENTIATE INDIVIDUAL PASSENGERS

CROSS-REFERENCE TO RELATED APPLICATIONS

This application is a Continuation of application Ser. No. 12/060,674 filed on Apr. 1, 2008, which is a continuation-in-part of U.S. patent application Ser. No. 11/492,545 filed Jul. 24, 2006, now U.S. Pat. No. 7,751,815 issued Jul. 6, 2010; which is a continuation of U.S. patent application Ser. No. 10/730,329 filed Dec. 7, 2003, now U.S. Pat. No. 7,113,780 issued Sep. 26, 2006; which is a continuation-in-part of U.S. patent application Ser. No. 09/686,923 filed Oct. 11, 2000, now U.S. Pat. No. 6,788,935 issued Sep. 7, 2004. This application is also related to U.S. patent application Ser. No. 12/060,662 filed Apr. 1, 2008 and U.S. patent application Ser. No. 12/060,645 filed Apr. 1, 2008.

FIELD OF THE INVENTION

This invention relates to cellular communications and, in particular, to a system that creates an Air-To-Ground Internet Protocol Tunnel in an airborne wireless cellular network to enable the network to differentiate individual passengers in the aircraft.

BACKGROUND OF THE INVENTION

It is a problem in the field of wireless communications to manage the wireless services provided by an aircraft network to passengers who are located in the aircraft as they roam among cell sites in the non-terrestrial cellular communication network. The aircraft network serves a plurality of subscribers, yet has a link to the ground-based network via a wide bandwidth connection that concurrently serves multiple individual subscribers. The management of this wide bandwidth connection to enable the individual identification of aircraft-based subscribers has yet to be addressed in existing wireless networks.

In the field of terrestrial cellular communications, it is common for a wireless subscriber to move throughout the area served by the network of their home cellular service provider and maintain their desired subscriber feature set. Feature set availability throughout the home network is managed by the home cellular service provider's database, often termed a Home Location Register (HLR), with data connections to one or more switches (packet or circuit), and various ancillary equipment, such as voice mail and short message servers, to enable this seamless feature set management. Each subscriber is associated with a one-to-one communication connection, which comprises a channel on the serving cell site, to access the desired communication services.

If the wireless subscriber were to transition inter-network, from the coverage area of their home cellular network to a network of the same or another cellular service provider (termed "roaming cellular service provider" herein), the wireless subscriber should have the ability to originate and receive calls in a unified manner, regardless of their location. In addition, it should be possible for a given wireless subscriber's feature set to move transparently with them. However, for this feature set transportability to occur, there needs to be database file sharing wherein the home cellular service Home Location Register (HLR) transfers the subscriber's authorized feature set profile to the roaming cellular service provider's database, often called a Visitor Location Register, or VLR. The VLR then recognizes that a given roaming wireless subscriber is authorized for a certain feature set and enables the roaming cellular service provider network to transparently offer these features to the wireless subscriber. In this manner, the roaming wireless subscriber retains the same authorized feature set, or "subscriber class", as they had on their home cellular service provider network.

When wireless subscribers enter the non-terrestrial cellular communication network (that is, they fly in an aircraft as passengers), they encounter a unique environment that traditionally has been disconnected from the terrestrial cellular network, where the wireless network of the aircraft interfaces the subscriber (also termed "passenger" herein) to various services and content. The aircraft wireless network, therefore, can function as a content filter or can create unique types of content that are directed to the individual passengers who are on-board the aircraft. However, although the aircraft network serves a plurality of passengers, it has a link to the ground-based Access Network via a wide bandwidth radio frequency connection that has a single IP address on the ground-based Access Network. Thus, the wide bandwidth radio frequency connection concurrently carries the communications of multiple individual passengers, but these communications cannot be individually identified by the ground-based Access Network. The management of this wide bandwidth connection to enable the individual identification of passengers via the assignment of individual unique IP addresses to each passenger wireless device has yet to be addressed in existing wireless networks.

BRIEF SUMMARY OF THE INVENTION

The above-described problems are solved and a technical advance achieved in the field by the present System For Creating An Air-To-Ground IP Tunnel In An Airborne Wireless Cellular Network To Differentiate Individual Passengers (termed "Aircraft Air-To-Ground IP Tunnel System" herein), which enables the assignment of individual Internet Protocol (IP) addresses to each of the passenger wireless devices operating in an aircraft and served by an airborne wireless cellular network, thereby to enable delivery of wireless services to the individually identified passenger wireless devices.

The Aircraft Air-To-Ground IP Tunnel System provides wireless communication services to passengers who are located onboard an aircraft by storing data indicative of the individually identified passenger wireless devices that are located onboard the aircraft. The Aircraft Air-To-Ground IP Tunnel System assigns a single IP address to each Point-to-Point Protocol radio frequency link which connects the aircraft network to the ground-based Access Network, but also creates an IP Tunnel from the ground-based Access Network to the aircraft. The IP Tunnel supports a plurality of IP addresses for the passenger wireless devices served by each of the Air-To-Ground radio frequency links thereby to enable each passenger wireless device to be uniquely identified with their own IP address. The NAT onboard the aircraft can utilize a greater number of IP addresses than one per link by the use of the Aircraft Air-To-Ground IP Tunnel System. Such an approach does not change IPCP or other EVDO protocols/messaging but does allow the passenger wireless device individual IP address to be directly visible to the ground-based Access Network.

The electronic services that are provided to the passenger include Internet, in-flight entertainment services, such as multi-media presentations, as well as destination-based services, which link the passenger's existing travel plans with offers for additional services that are available to the passenger at their nominal destination and their planned travel schedule, and optionally, voice services. The passenger thereby is presented with opportunities during their flight to enhance their travel experience, both in-flight and at their destination, by accessing the various services. The individual identification of each passenger wireless device simplifies the provision of these services and enables the customization of these services based upon predefined profiles created for the passenger.

This provision of the Aircraft Air-To-Ground IP Tunnel System is accomplished in part by the use of an "Inner Network" that connects the two segments of the "Outer Network", comprising the Air Subsystem and the ground-based Access Network. The Inner Network transmits both the subscriber traffic (comprising voice and/or other data) and feature set data between the Air Subsystem and the ground-based Access Network thereby to enable the passenger wireless devices that are located in the aircraft to receive consistent wireless communication services in both the terrestrial (ground-based) and non-terrestrial regions.

DETAILED DESCRIPTION OF THE INVENTION

Overall System Architecture

Figure 1:
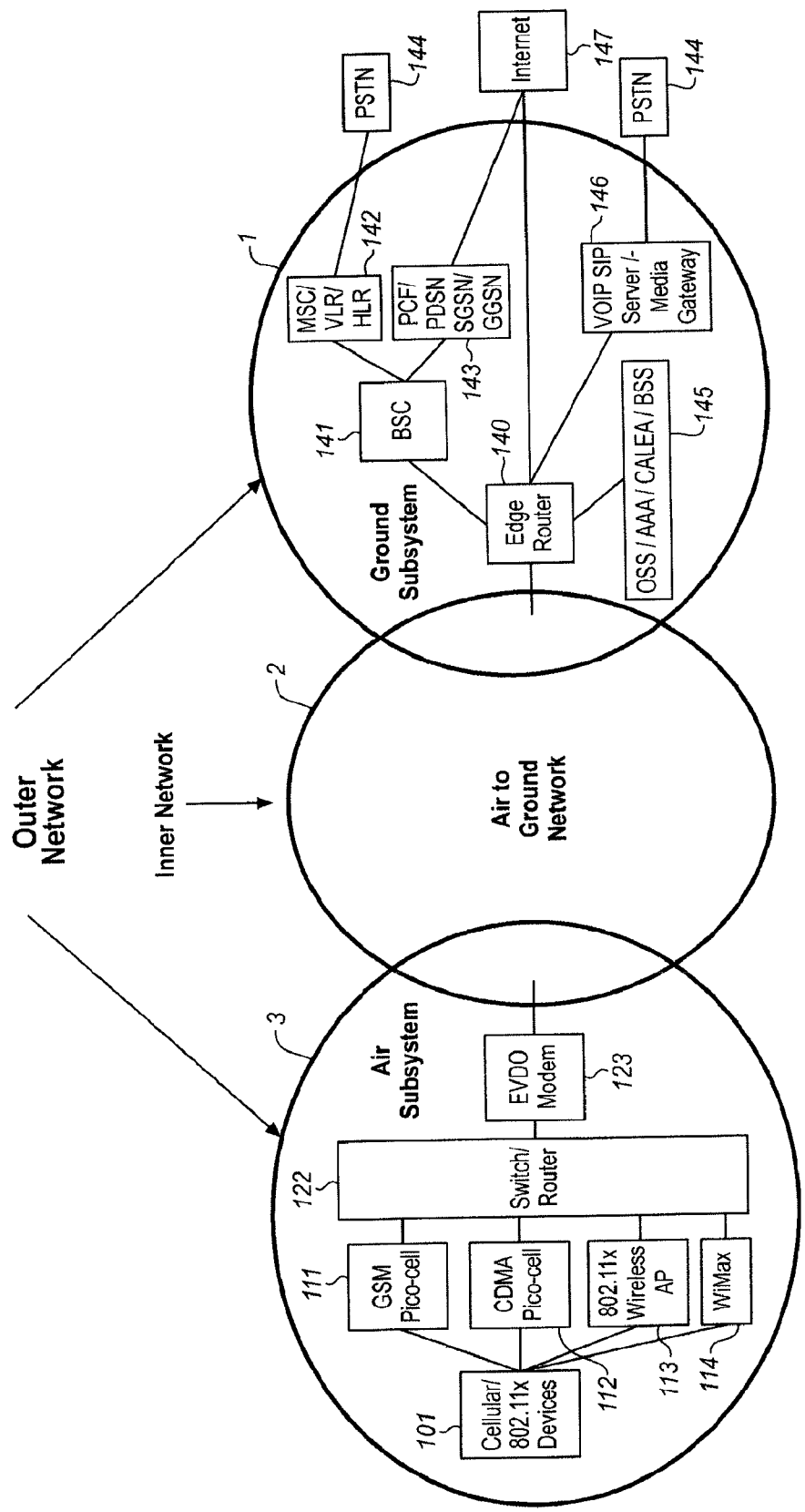
FIG. 1 illustrates, in block diagram form, the overall architecture of a composite Air-To-Ground network that interconnects an Air Subsystem with a Ground-Based Access Network.

FIG. 1 illustrates, in block diagram form, the overall architecture of the non-terrestrial cellular communication network, which includes an Air-To-Ground Network 2 (Inner Network) that interconnects the two elements of an Outer Network, comprising an Air Subsystem 3 and Ground Subsystem 1. This diagram illustrates the basic concepts of the non-terrestrial cellular communication network and, for the purpose of simplicity of illustration, does not comprise all of the elements found in a typical non-terrestrial cellular communication network. The fundamental elements disclosed in FIG. 1 provide a teaching of the interrelationship of the various elements which are used to implement a non-terrestrial cellular communication network to provide content to passenger wireless devices which are located in an aircraft.

The overall concept illustrated in FIG. 1 is the provision of an "Inner Network" that connects the two segments of the "Outer Network", comprising the Air Subsystem 3 and the Ground Subsystem 1. This is accomplished by the Air-To-Ground Network 2 transmitting both the passenger communication traffic (comprising voice and/or other data) and control information and feature set data between the Air Subsystem 3 and the Ground Subsystem 1 thereby to enable the passenger wireless devices that are located in the aircraft to receive services in the aircraft.

Air Subsystem

The "Air Subsystem" is the communications environment that is implemented in the aircraft, and these communications can be based on various technologies, including but not limited to: wired, wireless, optical, acoustic (ultrasonic), and the like. An example of such a network is disclosed in U.S. Pat. No. 6,788,935, titled "Aircraft-Based Network For Wireless Subscriber Stations".

The preferred embodiment for the Air Subsystem 3 is the use of wireless technology and for the wireless technology to be native to passenger wireless devices that passengers and crew carry on the aircraft. Thus, a laptop computer can communicate via a WiFi or WiMax wireless mode (or via a wired connection, such as a LAN), or a PDA could communicate telephony voice traffic via VoIP (Voice over IP) Likewise, a handheld cell phone that uses the GSM protocol communicates via GSM when inside the aircraft to the Air Subsystem. A CDMA cell phone would use CDMA and an analog AMPS phone would use analog AMPS when inside the aircraft to the Air Subsystem 3. The connection states could be packet-switched or circuit-switched or both. Overall, the objective on the Air Subsystem 3 is to enable seamless and ubiquitous access to the Air Subsystem 3 for passenger wireless devices that are carried by passengers and crew, regardless of the technology used by these passenger wireless devices.

The Air Subsystem 3 also provides the mechanism to manage the provision of services to the passenger wireless devices that are operating in the aircraft cabin. This management includes not only providing the passenger traffic connectivity but also the availability of non-terrestrial specific feature sets which each passenger is authorized to receive. These features include in-flight entertainment services, such as multi-media presentations, as well as destination-based services which link the passenger's existing travel plans with offers for additional services that are available to the passenger at their nominal destination and their planned travel schedule. The passenger thereby is presented with opportunities during their flight to enhance their travel experience, both in-flight and at their destination.

The passenger wireless devices 101 used in the aircraft can be identical to those used on the cellular/PCS ground-based communication network; however, these passenger wireless devices 101 are pre-registered with the carrier serving the aircraft and/or users have PIN numbers for authentication. In addition, an antenna interconnects the passenger wireless devices 101 with the in-cabin Base Transceiver Stations (BTS) 111-114, which are typically pico-cells with BSC/MSC functions integrated. BTS/BSC/MSC modules are added for each air-interface technology supported. The Switch/Router 122 acts as the bridging function (for media/content and signaling to a limited extent) between the Air Subsystem 3 and the ground-based Access Network 1, since the Switch/Router 122 places a call using the Modem 123 to the ground-based Access Network 1 via the Air-To-Ground Network 2. Switch/Router 122 converts the individual traffic and signaling channels from the base stations to/from an aggregate data stream, and transmits/receives the aggregate data streams over the Air-To-Ground Network 2 which maintains continuous service as the aircraft travels. The Modem 123 includes radio transmission equipment and antenna systems to communicate with ground-based transceivers in the ground-based portion of the Air-To-Ground Network 2. The individual traffic channels assigned on the Air-To-Ground Network 2 are activated based upon the traffic demand to be supported from the aircraft.

Air-To-Ground Network

The Air-To-Ground Network 2 shown in FIG. 1 is clearly one that is based on wireless communications (radio frequency or optical) between the Ground Subsystem 1 and the passenger wireless devices that are located in the aircraft, with the preferred approach being that of a radio frequency connection. This radio frequency connection takes on the form of a cellular topology where typically more than one cell describes the geographic footprint or coverage area of the composite Air-To-Ground Network 2. The air-to ground connection carries both passenger communications traffic and native network signaling traffic. In the preferred embodiment, the Air-To-Ground Network 2 transports all traffic to/from the aircraft in a single, aggregated communication channel. This "single pipe" has distinct advantages in terms of managing hard and soft handoffs as the aircraft transitions between one ground-based cell to the next. This approach also takes advantage of newer, higher speed wireless cellular technologies.

Alternatively, the Air-To-Ground Network 2 could be achieved through a wireless satellite connection where radio frequency links are established between the aircraft and a satellite and between the satellite and the Ground Subsystem 1, respectively. These satellites could be geosynchronous (appears to be stationary from an earth reference point) or moving, as is the case for Medium Earth Orbit (MEO) and Low Earth Orbit (LEO). Examples of satellites include, but are not limited to: Geosynchronous Ku Band satellites, DBS satellites (Direct Broadcast Satellite), the Iridium system, the Globalstar system, and the Inmarsat system. In the case of specialized satellites, such as those used for Direct Broadcast Satellite, the link typically is unidirectional, that is, from the satellite to the receiving platform, in this case an aircraft. In such a system, a link transmitting unidirectionally from the aircraft is needed to make the communication bidirectional. This link could be satellite or ground-based wireless in nature as previously described. Last, other means for communicating to aircraft include broad or wide area links such as High Frequency (HF) radio and more unique systems such as troposcatter architectures.

The Air-To-Ground Network 2 can be viewed as the conduit through which the passenger communications traffic as well as the control and network feature set data is transported between the Ground Subsystem 1 and the Air Subsystem 3. The Air-To-Ground Network 2 can be implemented as a single radio frequency link or multiple radio frequency links, with a portion of the signals being routed over different types of links, such as the Air-To-Ground Link and the Satellite Link. Thus, there is a significant amount of flexibility in the implementation of this system, using the various components and architectural concepts disclosed herein in various combinations.

Ground Subsystem

The Ground Subsystem 1 consists of Edge Router 140 which connects the voice traffic of the Air-To-Ground Network 2 with traditional cellular communication network elements, including a Base Station Controller 141 and its associated Mobile Switching Center 142 with its Visited Location Register, Home Location Register to interconnect the voice traffic to the Public Switched Telephone Network 144, and other such functionalities. In addition, the Base Station Controller 141 is connected to the Internet 147 via Public Switched Data Network 143 for call completions. Edge Router 140 also provides interconnection of the data traffic to the Internet 147, Public Switched Telephone Network 144 via Voice Over IP Server 146, and other such functionalities. These include the Authentication Server, Operating Subsystems, CALEA, and BSS servers 145.

Thus, the communications between the passenger wireless devices 101 located in an aircraft and the Ground Subsystem 1 of the ground-based communication network are transported via the Air Subsystem 3 and the Air-To-Ground Network 2 to the ground-based Base Station Controllers 141 of the non-terrestrial cellular communication network. The enhanced functionality described below and provided by the Air Subsystem 3, the Air-To-Ground Network 2, and the ground-based Base Station Controllers 141 renders the provision of services to the passenger wireless devices 101 located in an aircraft transparent to the passengers. The Radio Access Network (RAN) supports communications from multiple aircraft and may employ a single omni-directional signal, or may employ multiple spatial sectors which may be defined in terms of azimuth and/or elevation angles. Aircraft networks hand over the Point-to-Point communication links between Radio Access Networks (RAN) in different locations (different Ground Subsystems 1), in order to maintain continuity of service on Air-To-Ground Network 2. Handovers may be hard or soft, or may be a combination of hard and soft on the air-ground and ground-air links.

The Mobile Switching Center (MSC) provides mobility management for all airborne systems and provides hand over management between ground stations as an airborne system moves between the service areas of adjoining Ground Subsystems 1. The Base Station Controller (BSC) interfaces all traffic to/from the Base Transceiver Subsystem (BTS). The Packet Data Serving Node (PDSN) controls assignment of capacity of each of the Base Transceiver Subsystems (BTS) amongst the airborne systems within their respective service areas.

Typical Aircraft-Based Network

Figure 2:
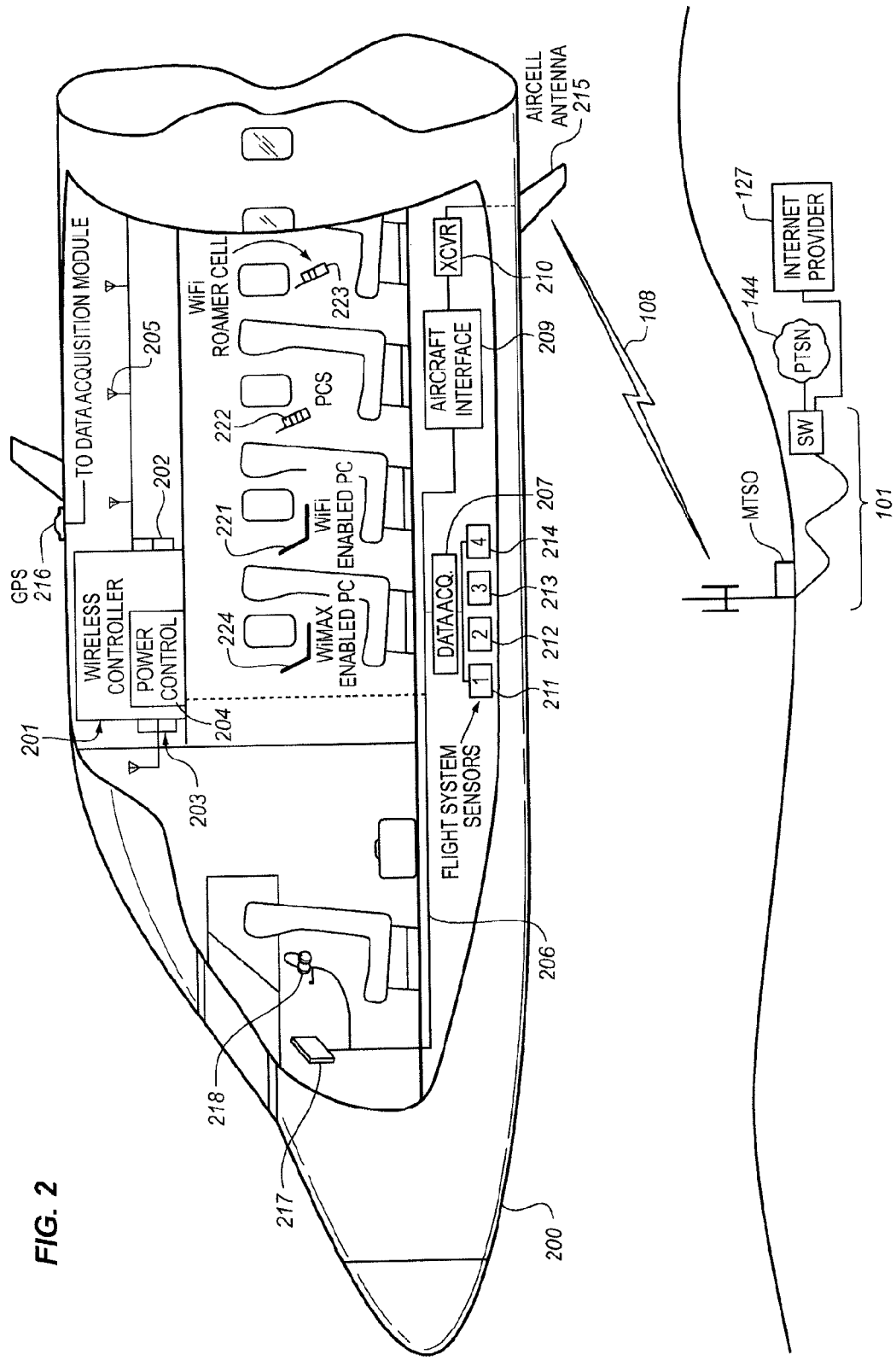
FIG. 2 illustrates, in block diagram form, the architecture of a typical embodiment of a typical aircraft-based network for passenger wireless devices as embodied in a multi-passenger commercial aircraft.

FIG. 2 illustrates the architecture of a typical aircraft-based network for passenger wireless devices as embodied in a multi-passenger commercial aircraft 200. This system comprises a plurality of elements used to implement a communication backbone that is used to enable wireless communication for a plurality of wireless communication devices of diverse nature. The aircraft-based network for passenger wireless devices comprises a Local Area Network 206 that includes a radio frequency communication system 201 that uses a spread spectrum paradigm and having a short range of operation. This Local Area Network 206 supports both circuit-switched and packet-switched connections from passenger wireless devices 221-224 and interconnects the communications of these passenger wireless devices 221-224 via a gateway transceiver or transceivers 210 to the Public Switched Telephone Network (PSTN) 144 and other destinations, such as the Internet 147 or Public Data Switched Network (PDSN). The wireless passengers thereby retain their single number identity as if they were directly connected to the Public Switched Telephone Network 144. The passenger wireless devices 221-224 include a diversity of communication devices, such as laptop computers 221, cellular telephones 222, MP3 music players (not shown), Personal Digital Assistants (PDA) (not shown), WiFi-based devices 223, WiMax-based devices 224, and the like, and for simplicity of description are all collectively termed "passenger wireless devices" herein, regardless of their implementation specific details.

The basic elements of the aircraft-based network for passenger wireless devices comprises at least one antenna 205 or means of coupling electromagnetic energy to/from the Air Subsystem 3 located within the aircraft 200 which serves to communicate with the plurality of passenger wireless devices 221-224 located within the aircraft 200. The at least one antenna 205 is connected to a wireless controller 201 that encompasses a plurality of elements that serve to regulate the wireless communications with the plurality of passenger wireless devices 221-224. The wireless controller 201 includes at least one low power radio frequency transceiver 202 for providing a circuit-switched communication space using a wireless communication paradigm, such as PCS, CDMA, or GSM, for example. In addition, the wireless controller 201 includes a low power radio frequency transceiver 203 for providing a data-based packet-switched communication space using a wireless communication paradigm, such as WiFi (which could also convey packet-switched Voice over Internet Protocol (VoIP)).

Finally, the wireless controller 201 includes a power control segment 204 that serves to regulate the power output of the plurality of passenger wireless devices. It also serves to, by RF noise or jamming apparatus, prevent In-Cabin passenger wireless devices from directly and errantly accessing the ground network when in a non-terrestrial mode. The ultra-low airborne transmit power levels feature represents a control by the Power Control element 204 of the wireless controller 201 of the aircraft-based network for passenger wireless devices to regulate the output signal power produced by the passenger wireless devices 221-224 to minimize the likelihood of receipt of a cellular signal by ground-based cell sites or ground-based passenger wireless devices.

It is obvious that these above-noted segments of the wireless controller 201 can be combined or parsed in various ways to produce an implementation that differs from that disclosed herein. The particular implementation described is selected for the purpose of illustrating the concept of the invention and is not intended to limit the applicability of this concept to other implementations.

The wireless controller 201 is connected via a Local Area Network 206 to a plurality of other elements which serve to provide services to the passenger wireless devices 221-224. These other elements can include an Aircraft Interface 209 for providing management, switching, routing, and aggregation functions for the communication transmissions of the passenger wireless devices. A data acquisition element 207 serves to interface with a plurality of flight system sensors 211-214 and a Global Positioning System element 216 to collect data from a plurality of sources as described below. Furthermore, pilot communication devices, such as the display 217 and headset 218, are connected to this Local Area Network 206 either via a wired connection or a wireless connection.

Finally, a gateway transceiver(s) 210 is used to interconnect the Aircraft Interface 209 to an antenna 215 to enable signals to be transmitted from the aircraft-based network for passenger wireless devices to transceivers located on the ground. Included in these components is a communications router function to forward the communication signals to the proper destinations. Thus, signals that are destined for passengers on the aircraft are routed to these individuals, while signals routed to passengers located, for example, on the ground are routed to the Ground Subsystem. Aircraft antenna patterns that typically minimize nadir (Earth directed) effective radiated power (ERP) may be used in the implementation of the antenna(s) 215 on the aircraft to serve the aircraft-based network for passenger wireless devices.

Passenger Login For System Access

On each aircraft, the passenger access to electronic communications typically is regulated via a passenger wireless device registration process, where each electronic device must be identified, authenticated, and authorized to receive service. Since the aircraft is a self-contained environment with respect to the wireless communications between the passenger wireless devices and the airborne wireless network extant in the aircraft, all communications are regulated by the network controller. Thus, when a passenger activates their passenger wireless device, a communication session is initiated between the passenger wireless device and the network controller to identify the type of device the passenger is using and, thus, its wireless protocol. A "splash screen" is delivered to the passenger on the passenger wireless device to announce entry into the wireless network portal. Once this is established, the network controller transmits a set of login displays to the passenger wireless device to enable the passenger to identify themselves and validate their identity (if the passenger wireless device is not equipped to automatically perform these tasks via a smart client which automatically logs the passenger into the network). As a result of this process, the passenger wireless device is provided with a unique electronic identification (IP address), and the network can respond to the passenger wireless device without further administrative overhead. The authentication process may include the use of security processes, such as a password, scan of a passenger immutable characteristic (fingerprint, retina scan, etc.), and the like.

Once the passenger wireless device is logged in, the passenger can access the free standard electronic services that are available from the network or customized electronic services for the particular passenger. The screens that are presented to the passenger can be customized to present the branding of the airline on which the passenger is traveling.

Mobile Wireless Network Architecture

Figure 3A:
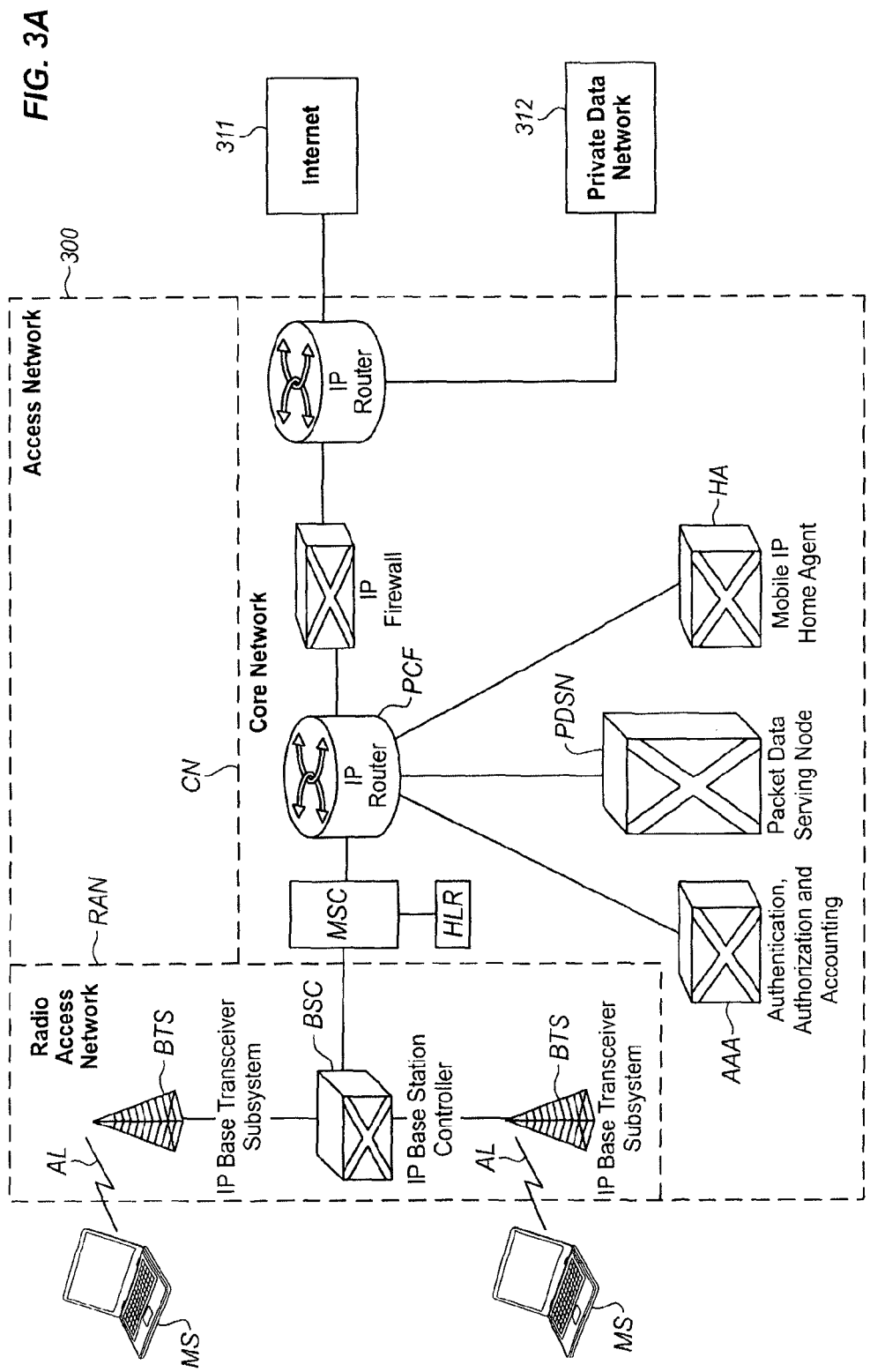
FIGS. 3A and 3B illustrate, in block diagram form, the architecture of a typical EVDO cellular network for IP data only service and for IP data and voice services, respectively.
Figure 3B:
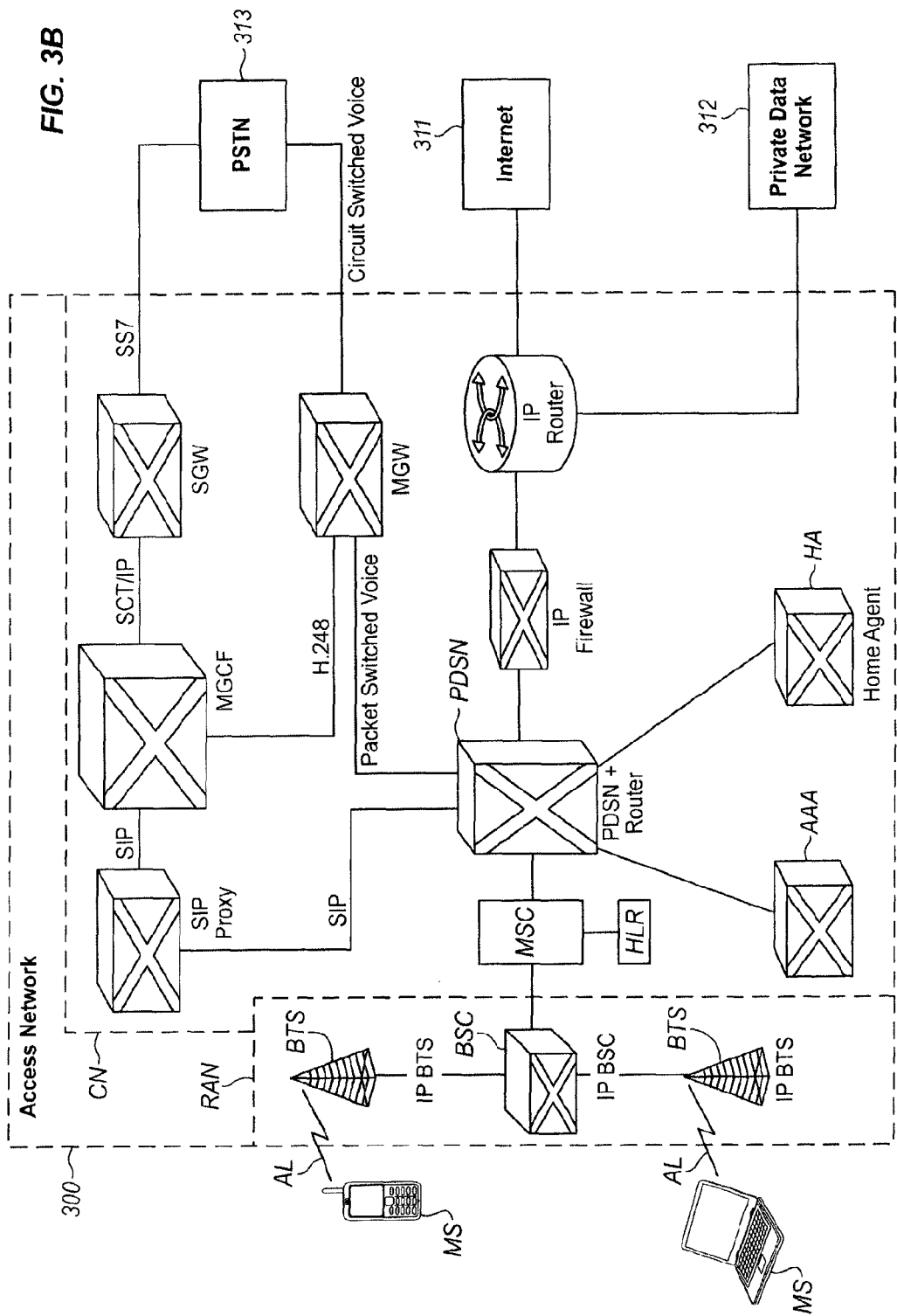

For simplicity of description, the following example is based upon the use of a CDMA2000 EVDO cellular network paradigm. However, the concepts illustrated herein are not limited to this implementation and it is expected that other implementations can be created based upon other network architectures and implementations. Therefore, FIGS. 3A and 3B illustrate, in block diagram form, the architecture of a typical EVDO cellular network for IP data only service and for IP data and voice services, respectively, and which are used to illustrate the architecture and operation of the present Aircraft Air-To-Ground IP Tunnel System. CDMA2000 is a hybrid 2.5G/3G technology of mobile telecommunications that uses CDMA (code division multiple access) to send digital radio, voice, data, and signaling data between passenger wireless devices and cell sites. The architecture and operation of the CDMA2000 cellular network is standardized by the 3rd Generation Partnership Project 2 (3GPP2). In a CDMA2000 cellular network, two radio Access Network technologies are supported: 1xRTT and EV-DO (Evolution-Data Optimized), wherein CDMA2000 is considered a third generation (3G) technology when the EV-DO Access Network is used.

The CDMA2000 cellular network (also termed "Access Network" herein) comprises three major parts: the core network (CN), the radio Access Network (RAN) and the passenger wireless device (MS). The core network (CN) is further decomposed in two parts, one interfacing to external networks such as the Public Switched Telephone Network (PSTN) and the other interfacing to an IP based networks such as the Internet 311 and/or private data networks 312. The passenger wireless device MS terminates the radio path on the user side of the cellular network and enables subscribers to Access Network services over the interface Um implemented to interconnect the passenger wireless device (MS) with the Access Network 300.

Several key components of the Access Network 300 for IP data only as illustrated in FIG. 3A are:

Base Transceiver System (BTS): an entity that provides transmission capabilities across the Um reference point. The Base Transceiver System (BTS) consists of radio devices, antenna, and equipment;

Base Station Controller (BSC): an entity that provides control and management for one or more Base Transceiver Systems (BTS); and Packet Control Function (PCF): an entity that provides the interface function to the packet-switched network (Internet 311 and/or Private Data Network 312).

The passenger wireless device (MS) functions as a mobile IP client. The passenger wireless device (MS) interacts with the Access Network 300 to obtain appropriate radio resources for the exchange of packets, and keeps track of the status of radio resources (e.g. active, stand-by, dormant). The passenger wireless device (MS) accepts buffer packets from the Base Transceiver System (BTS) when radio resources are not in place or are insufficient to support the flow to the Access Network 300. Upon power-up, the passenger wireless device (MS) automatically registers with the Home Location Register (HLR) in the Mobile Switching Center (MSC) in order to:

Authenticate the passenger wireless device (MS) for the environment of the accessed network;

Provide the Home Location Register (HLR) with the passenger wireless device's present location; and Provide the Serving Mobile Switching Center (MSC) with the passenger wireless device's permitted feature set.

After successfully registering with the Home Location Register (HLR), the passenger wireless device (MS) is ready to place voice and data calls. These may take either of two forms, Circuit-Switched Data (CSD) or Packet-Switched Data (PSD), depending on the passenger wireless device's own compliance (or lack thereof) with the IS-2000 standard.

Passenger wireless devices must comply with IS-2000 standards to initiate a packet data session using the Access Network 300. Passenger wireless devices which have only IS-95 capabilities are limited to Circuit-Switched Data transmitted via the Public Switched Telephone Network (PSTN), while IS-2000 terminals can select either the Packet-Switched Data or Circuit-Switched Data. Parameters forwarded by the passenger wireless device (MS) over the air link (AL) to the Access Network 300 determine the type of service requested. For each data session, a Point-to-Point Protocol (PPP) session is created between the passenger wireless device (MS) and the Packet Data Serving Node (PDSN). IP address assignment for each passenger wireless device can be provided by either the Packet Data Serving Node (PDSN) or a Dynamic Host Configuration Protocol (DHCP) server via a Home Agent (HA).

The Radio Access Network (RAN)

The Radio Access Network (RAN) is the passenger wireless device's entry point for communicating either data or voice content. It consists of:

The air link (AL);

The cell site tower/antenna and the cable connection to the Base Transceiver; Subsystem (BTS);

The Base Transceiver Subsystem (BTS);

The communications path from the Base Transceiver Subsystem to the Base Station Controller (BSC);

The Base Station Controller (BSC); and

The Packet Control Function (PCF).

The Radio Access Network (RAN) has a number of responsibilities that impact the network's delivery of packet services in particular. The Radio Access Network (RAN) must map the mobile client identifier reference to a unique link layer identifier used to communicate with the Packet Data Serving Node (PDSN), validate the passenger wireless device for access service, and maintain the established transmission links.

The Base Transceiver Subsystem (BTS) controls the activities of the air link (AL) and acts as the interface between the Access Network 300 and the passenger wireless device (MS). Radio Frequency resources such as frequency assignments, sector separation and transmit power control are managed at the Base Transceiver Subsystem (BTS). In addition, the Base Transceiver Subsystem (BTS) manages the back-haul from the cell site to the Base Station Controller (BSC) to minimize any delays between these two elements.

The Base Station Controller (BSC) routes voice- and circuit-switched data messages between the cell sites and the Mobile Switching Center (MSC). It also bears responsibility for mobility management: it controls and directs handoffs from one cell site to another as needed.

The Packet Control Function (PCF) routes IP packet data between the mobile station (MS) within the cell sites and the Packet Data Serving Node (PDSN). During packet data sessions, it assigns available supplemental channels as needed to comply with the services requested by the passenger wireless device (MS) and paid for by the subscribers.

Packet Data Serving Node (PDSN)

The Packet Data Serving Node (PDSN) is the gateway from the Radio Access Network (RAN) into the public and/or private packet networks. In a simple IP network, the Packet Data Serving Node (PDSN) acts as a standalone Network Access Server (NAS), while in a mobile IP network it can be configured as a Home Agent (HA) or a Foreign Agent (FA). The Packet Data Serving Node (PDSN) implements the following activities:

Manage the radio-packet interface between the Base Station Subsystem (BTS), the Base Station Controller (BSC) and the IP network by establishing, maintaining and terminating link layer to the mobile client;

Terminate the Point-to-Point Protocol (PPP) session initiated by the subscriber;

Provide an IP address for the subscriber (either from an internal pool or through a Dynamic Host Configuration Protocol (DHCP) server or through an Authentication, Authorization, and Accounting (AAA) server);

Perform packet routing to external packet data networks or packet routing to the Home Agent (HA) which optionally can be via secure tunnels;

Collect and forward packet billing data;

Actively manage subscriber services based on the profile information received from the SCS server of the Authentication, Authorization, and Accounting (AAA) server; and Authenticate users locally, or forward authentication requests to the Authentication, Authorization, and Accounting (AAA) server.

Authentication, Authorization, and Accounting Server

The Authentication, Authorization, and Accounting (AAA) server is used to authenticate and authorize subscribers for network access and to store subscriber usage statistics for billing and invoicing.

The Home Agent

The Home Agent (HA) supports seamless data roaming into other networks that support 1xRTT. The Home Agent (HA) provides an anchor IP address for the mobile and forwards any mobile-bound traffic to the appropriate network for delivery to the handset. It also maintains user registration, redirects packets to the Packet Data Serving Node (PDSN) and (optionally) tunnels securely to the Packet Data Serving Node (PDSN). Lastly, the Home Agent (HA) supports dynamic assignment of users from the Authentication, Authorization, and Accounting (AAA) server and (again optionally) assigns dynamic home addresses.

Traditional Single Call Setup In A CDMA2000 Access Network

A successful call set-up scenario for a single passenger wireless device to establish a communication connection in a CDMA2000 Access Network is described below. Note that this explanation bypasses the radio reception/transmission activities of the Base Transceiver Subsystem (BTS), concentrating instead on the protocol functions that begin with the Origination dialogue between the passenger wireless device (MS) and the Base Station Controller (BSC):

1. To register for packet data services, the passenger wireless device (MS) sends an Origination Message over the Access Channel to the Base Station Subsystem (BSS).
2. The Base Station Subsystem (BSS) acknowledges the receipt of the Origination Message, returning a Base Station Ack Order to the wireless device (MS).
3. The Base Station Subsystem (BSS) constructs a CM Service Request message and sends the message to the Mobile Switching Center (MSC).
4. The Mobile Switching Center sends an Assignment Request message to the Base Station Subsystem (BSS) requesting assignment of radio resources. No terrestrial circuit between the Mobile Switching Center (MSC) and the Base Station Subsystem (BSS) is assigned to the packet data call.
5. The Base Station Subsystem (BSS) and the passenger wireless device (MS) perform radio resource set-up procedures. The Packet Control Function (PCF) recognizes that no A10 connection associated with this passenger wireless device (MS) is available and selects a Packet Data Serving Node (PDSN) for this data call. The A10 connection is a term defined by the standards bodies and refers to an Interface between Base Station Controller (BSC) and the Packet Data Serving Node (PDSN), where A10 references IP user data exchanged between the between Base Station Controller (BSC) and the Packet Data Serving Node (PDSN).
6. The Packet Control Function (PCF) sends an A11-Registration Request message to the selected Packet Data Serving Node (PDSN).
7. The A11-Registration Request is validated and the Packet Data Serving Node (PDSN) accepts the connection by returning an A11-Registration Reply message. Both the Packet Data Serving Node (PDSN) and the Packet Control Function (PCF) create a binding record for the A10 connection. The term A11 references signaling exchanged between the between Base Station Controller (BSC) and the Packet Data Serving Node (PDSN).
8. After both the radio link and the A10 connection are set-up, the Base Station Subsystem (BSS) sends an Assignment Complete message to the Mobile Switching Center (MSC).
9. The mobile and the Packet Data Serving Node (PDSN) establish the link layer (PPP) connection and then perform the MIP registration procedures over the link layer (PPP) connection.
10. After completion of MIP registration, the mobile can send/receive data via GRE framing over the A10 connection.
11. The Packet Control Function (PCF) periodically sends an A11-Registration Request message for refreshing registration for the A10 connection.
12. For a validated A11-Registration Request, the Packet Data Serving Node (PDSN) returns an A11-Registration Reply message. Both the Packet Data Serving Node (PDSN) and the Packet Control Function (PCF) update the A10 connection binding record.

For a circuit-switched voice call, the additional elements shown in FIG. 3B are required. In particular, the packet-switched voice received from the passenger wireless device (MS) is forwarded from the Packet Data Serving Node (PDSN) to the Media Gateway (MGW) where it is converted to circuit-switched voice and delivered to the Public Switched Telephone Network (PTSN). In addition, call setup data is exchanged with the Session Initiated protocol Proxy Server (SIP) to provide a signaling and call setup protocol for IP-based communications that can support a superset of the call processing functions and features present in the Public Switched Telephone Network (PSTN). The Media Gateway Control Function (MGCF) and the Signaling Gateway (SGW) implement the call processing features present in Signaling System 7 (SS7).

As can be seen from the above description, this Access Network 300 is passenger wireless device-centric, in that it is predicated on each passenger wireless device establishing an individual Air Link (AL) radio frequency connection with the local Base Transceiver Subsystem (BTS). There is nothing in this architecture that specifically addresses the instance where a plurality of passenger wireless devices are served by a broadband communication link from some location (aircraft, ship, train, etc.), with the broadband link being terminated at the edge of the Access Network 300. The difficulty with the use of the broadband link is that the Packet Data Serving Node (PDSN) assigns a single IP address to the broadband link as part of the Point-to-Point Protocol (PPP) and the passenger wireless devices that exist at the distal end of the broadband link are not identified to the Packet Data Serving Node (PDSN) and do not, therefore, receive individual services.

Individual IP Addresses For Passenger Wireless Devices Onboard An Aircraft

For forward traffic from the ground-based Access Network to a passenger wireless device on the aircraft, the Packet Data Serving Node (PDSN) maps a packet's destination IP address to an Air-To-Ground Modem that is located on board the aircraft. However, the standard Packet Data Serving Node (PDSN) only supports a handful of IP addresses per Air-To-Ground Modem and there are not enough IP addresses to be able to assign one per passenger wireless device located onboard the aircraft. The Network Address Translation (NAT) onboard the aircraft allows the Packet Data Serving Node (PDSN) to route data communications to multiple users using a single address for the aircraft, but in doing so, the Network Address Translation (NAT) hides the user addresses from the serving Packet Data Serving Node (PDSN) as well as the Network Operations Center (NOC) which is located on the ground. This makes the following functions difficult/impossible to implement in the Access Network:

1. Per-user, bandwidth shaping (e.g., limit P2P traffic).
2. Per-user, forward access control.
3. Transmission Control Protocol (TCP) optimization.
4. CALEA.

Item #4 (CALEA) noted above is the Communications Assistance for Law Enforcement Act (CALEA), which is a United States wiretapping law passed in 1994. CALEA was intended to preserve the ability of law enforcement agencies to conduct electronic surveillance by requiring that all telecommunications carriers and manufacturers of telecommunications equipment modify and design their equipment, facilities, and services to ensure that the government has the necessary surveillance capabilities. Common carriers, facilities-based broadband Internet access providers, and providers of interconnected Voice over Internet Protocol (VoIP) service—all three types of entities are defined to be "telecommunications carriers" for purposes of CALEA section 102. The Act obliges telephone companies to make it possible for law enforcement agencies to tap any phone conversations carried out over its networks, as well as making call detail records available. The Act also stipulates that it must not be possible for a person to detect that his or her conversation is being monitored by the respective government agency.

Therefore, the Access Network needs to be able to differentiate data streams that are received from and transmitted via the Air-To-Ground Modem(s) to the individual passenger wireless devices which are located onboard the aircraft. The way to do this is by making the user IP addresses visible on the ground to the Access Network, which implies that the IP addresses assigned to passenger wireless devices should be globally unique within the Airborne Wireless Cellular Network. To accomplish this, the Aircraft ID can be made part of a "subnet" for the IP address assigned via aircraft Dynamic Host Configuration Protocol (DHCP), which is a protocol used by networked devices (clients) to obtain various parameters necessary for the clients to operate in an Internet Protocol (IP) network. By using this protocol, system administration workload greatly decreases, and devices can be added to the network with minimal or no manual configurations. This makes it easier for the Network Operations Center (NOC) to map a user's IP address to an aircraft.

When a Dynamic Host Configuration Protocol (DHCP)-configured client (such as the aircraft-based Air-To-Ground Modem) connects to a network, its Dynamic Host Configuration Protocol (DHCP) client sends a broadcast query requesting necessary information from the serving Dynamic Host Configuration Protocol (DHCP) server. The Dynamic Host Configuration Protocol (DHCP) server manages a pool of IP addresses and information about client configuration parameters such as the default gateway, the domain name, the DNS servers, other servers such as time servers, and so forth. Dynamic Host Configuration Protocol (DHCP) provides a mechanism for allocating IP addresses wherein the Network Operations Center (NOC) assigns a range of IP addresses to the aircraft-based Dynamic Host Configuration Protocol (DHCP) server. The request-and-grant process of this protocol uses a lease concept with a controllable time period, allowing the Dynamic Host Configuration Protocol (DHCP) server to reclaim (and then reallocate) IP addresses that are not renewed (dynamic re-use of IP addresses).

There are three implementations of the present Aircraft Air-To-Ground IP Tunnel System:
 1. Layer 2 IP Tunnel.
 2. Layer 3 IP Tunnel.
 3. NAT IP Tunnel.

Figure 4:
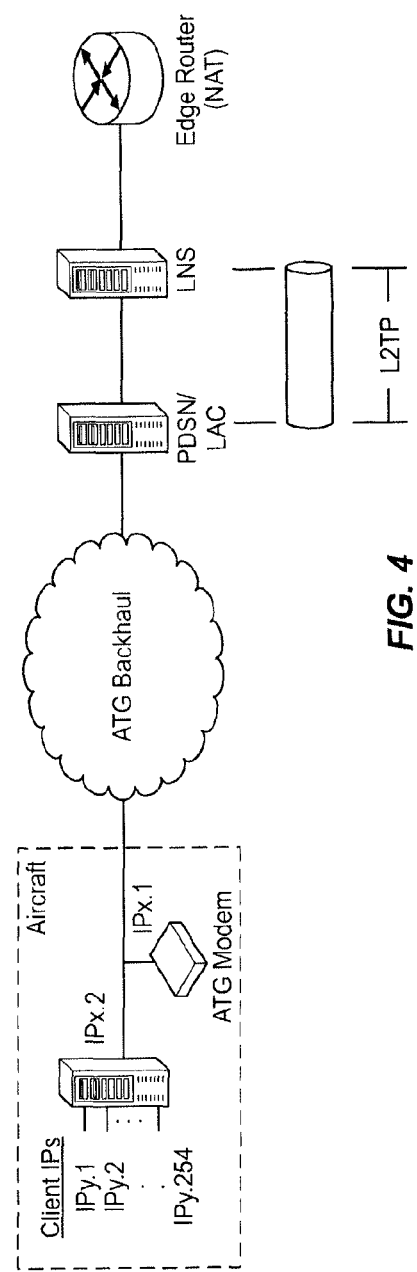
FIG. 4 illustrates, in block diagram form, the architecture of the Aircraft Air-To-Ground IP Tunnel System using a Layer 2 IP Tunnel.
Figure 5:
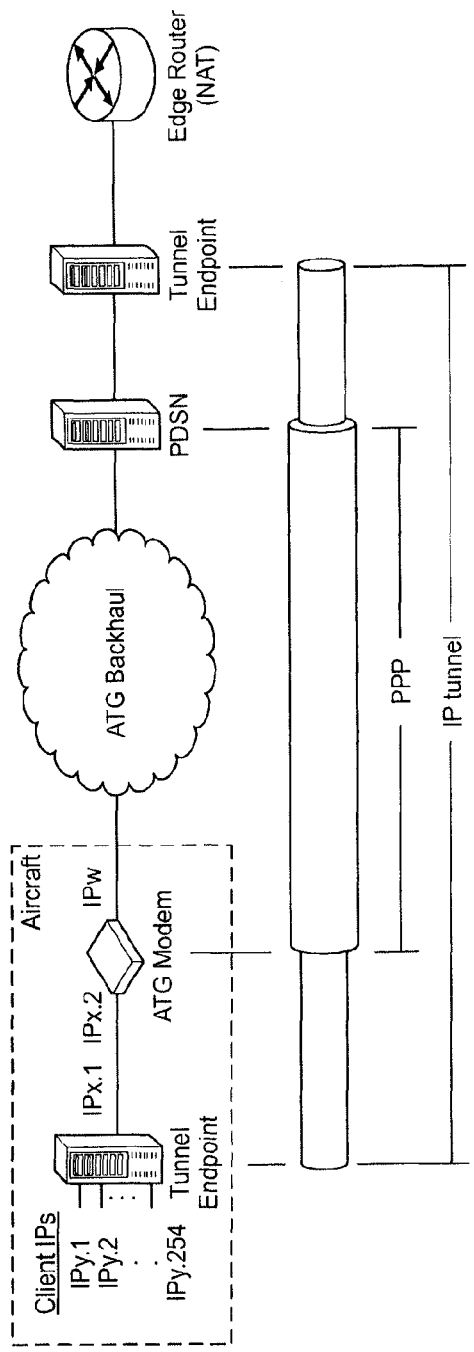
FIG. 5 illustrates, in block diagram form, the architecture of the Aircraft Air-To-Ground IP Tunnel System using a Layer 3 IP Tunnel.
Figure 6:
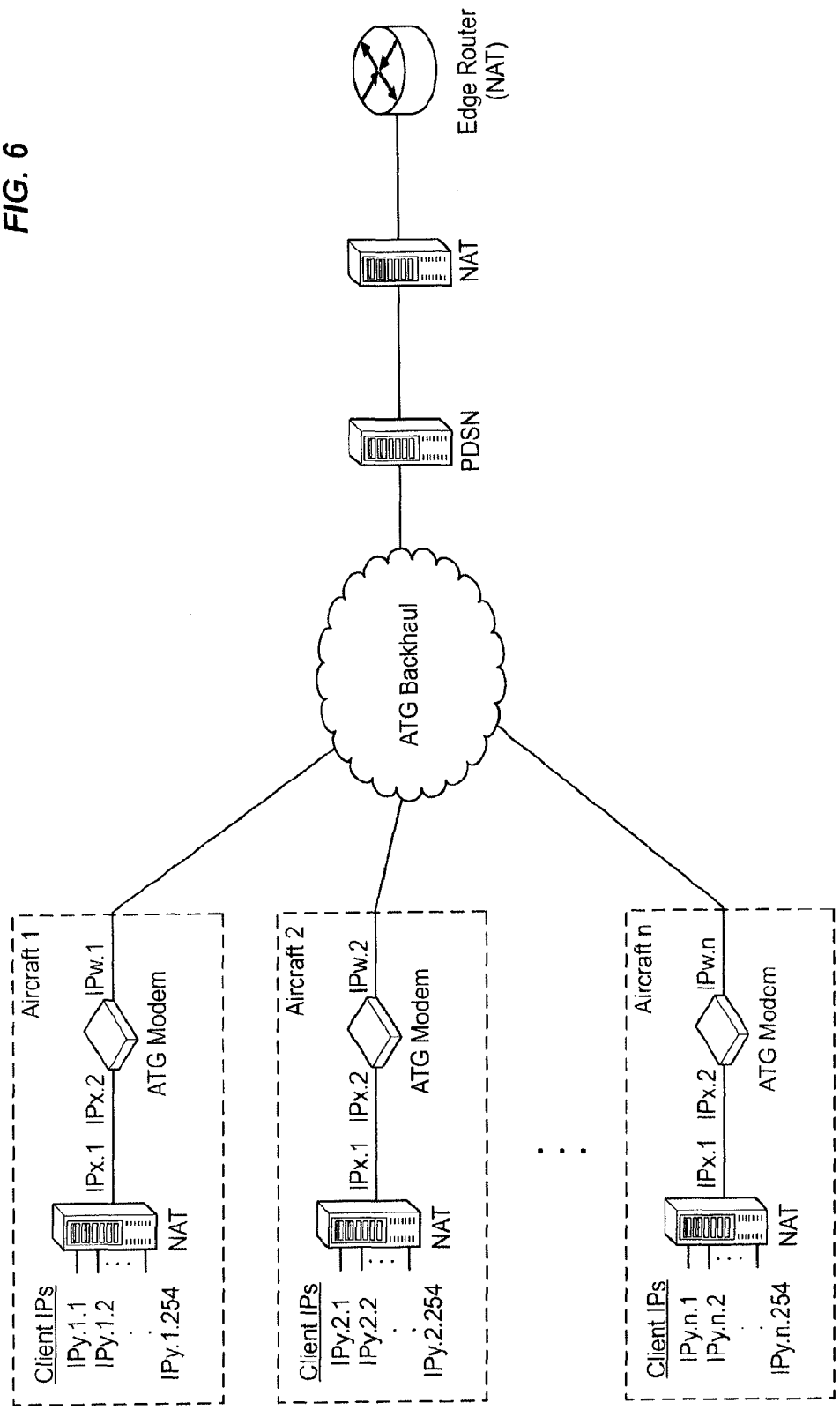
FIG. 6 illustrates, in block diagram form, the architecture of the Aircraft Air-To-Ground IP Tunnel System using a NAT IP Tunnel.

FIG. 4 illustrates, in block diagram form, the architecture of the Aircraft Air-To-Ground IP Tunnel System using a Layer 2 IP Tunnel, FIG. 5 illustrates, in block diagram form, the architecture of the Aircraft Air-To-Ground IP Tunnel System using a Layer 3 IP Tunnel, and FIG. 6 illustrates, in block diagram form, the architecture of the Aircraft Air-To-Ground IP Tunnel System using a NAT IP Tunnel. These implementations are described below.

This approach does not change the Internet Protocol Control Protocol (IPCP) or other EVDO protocols/messaging. The benefit of more IP addresses is that the airborne network can assign a unique IP address per passenger wireless device (MS) and have this address be directly visible to the ground-based Access Network and its associated systems. The method to assign multiple IP addresses for each Air-To-Ground link is completed by having the Packet Data Serving Node (PDSN).

Layer 2 IP Tunnel

FIG. 4 illustrates, in block diagram form, the architecture of the Aircraft Air-To-Ground IP Tunnel System using a Layer 2 IP Tunnel. In computer networking, the Layer 2 Tunneling Protocol (L2TP) is a tunneling protocol used to support Virtual Private Networks (VPNs). Layer 2 Tunneling Protocol (L2TP) acts like a data link layer (Layer 2 of the OSI model) protocol for tunneling network traffic between two peers over an existing network (usually the Internet). Layer 2 Tunneling Protocol (L2TP) is in fact a layer 5 protocol session layer, and the entire Layer 2 Tunneling Protocol (L2TP) packet, including payload and Layer 2 Tunneling Protocol (L2TP) header, is sent within a UDP datagram. It is common to carry Point-to-Point Protocol (PPP) sessions within a Layer 2 Tunneling Protocol (L2TP) tunnel.

The two endpoints of a Layer 2 Tunneling Protocol (L2TP) tunnel are called the L2TP Access Concentrator (LAC) and the L2TP Network Server (LNS). The L2TP Access Concentrator (LAC) is the initiator of the tunnel while the L2TP Network Server (LNS) is the server, which waits for new tunnels. Once an IP tunnel is established, the network traffic between the peers is bidirectional. To be useful for networking, higher-level protocols are then run through the Layer 2 Tunneling Protocol (L2TP) tunnel. To facilitate a Layer 2 Tunneling Protocol (L2TP) session (or call) is established within the tunnel for each higher-level protocol such as Point-to-Point Protocol (PPP). Either the L2TP Access Concentrator (LAC) or L2TP Network Server (LNS) may initiate sessions. The traffic for each session is isolated by Layer 2 Tunneling Protocol (L2TP), so it is possible to set up multiple virtual networks across a single tunnel. The packets exchanged within a Layer 2 Tunneling Protocol (L2TP) tunnel are categorized as either control packets or data packets. Layer 2 Tunneling Protocol (L2TP) provides reliability features for the control packets, but no reliability for data packets. Reliability, if desired, must be provided by the nested protocols running within each session of the Layer 2 Tunneling Protocol (L2TP) tunnel.

In the Packet Data Serving Node (PDSN) would act as the L2TP Access Concentrator (LAC) since this functionality is supported by the Packet Data Serving Node (PDSN) and a new node (activated Air-To-Ground Modem) would act as the L2TP Network Server (LNS). The Aircraft Network and ground network essentially establish a router-to-router Virtual Private Network (VPN) connection, where the IP address for the Point-to-Point Protocol (PPP) endpoint on the aircraft would be static. Using this paradigm, it may be decided to establish multiple flows, each containing a Layer 2 Tunneling Protocol (L2TP) tunnel. If so, the Packet Data Serving Node (PDSN) can establish 3 different tunnels/flows:
 Low priority—passenger data (best effort);
 Medium priority—NOC/OA&M; and
 High priority—crew/FAM & passenger VOIP.

In addition, there is no tunneling overhead (bandwidth used) over the Air-To-Ground link, which is the tunnel between the Packet Data Serving Node (PDSN) acting as the L2TP Access Concentrator (LAC) and the aircraft-based Air-To-Ground Modem acting as the L2TP Network Server (LNS).

Thus, as shown in FIG. 4, both the L2TP Network Server (LNS) and the L2TP Access Concentrator (LAC) are implemented in the Access Network, upstream from the Edge Router, which functions to perform the Network Address Translation (NAT). The L2TP Network Server (LNS) acts as a router to and from the Aircraft Network and the intervening L2TP Access Concentrator (LAC) ignores the individual IP addresses of the passenger wireless devices, since the destination for the packets from the L2TP Network Server (LNS) is the Air-To-Ground Modem, which has an IPx.1 address. Once the Layer 2 IP Tunnel is established, the L2TP Access Concentrator (LAC) tunnels all the packets and ignores the multiple IP addresses associated with the multitude of passenger wireless devices on the aircraft. The packets are received by the Air-To-Ground Modem (IPx.1) and forwarded to the Router (IPx.2) on the airplane, which knows how to deliver the packets to and from the plurality of passenger wireless devices having IP addresses IPx.*. The passenger wireless devices are assigned IP addresses IPy.* which are private, globally unique, dynamic IP addresses for the passenger wireless devices located in a particular aircraft. The various nodes on the aircraft, such as the Router and Air-To-Ground Modem, are assigned IP addresses in the IPx.* range, where the IPx.* IP addresses are private, globally unique, static IP addresses.

Layer 3 IP Tunnel

FIG. 5 illustrates, in block diagram form, the architecture of the Aircraft Air-To-Ground IP Tunnel System using a Layer 3 IP Tunnel. This is an extension of the Layer 3 IP Tunnel, wherein the Tunnel packets are transmitted at Layer 3 (IP) of the protocol over the Air-To-Ground link. One side of the IP Tunnel terminates just before the Air-To-Ground Modem on the aircraft and NAT does not need to be performed on the aircraft. The other end of IP Tunnel terminates just after the Packet Data Serving Node (PDSN) on the ground. This configuration can establish three tunnels on three different data flows:

Low priority—passenger data (best effort);
Medium priority—NOC/OA&M; and
High priority—crew/FAM & passenger VOIP.

As shown in FIG. 5, the passenger wireless devices are assigned IP addresses IPy.* which are private, globally unique, dynamic IP addresses for the passenger wireless devices located in a particular aircraft. The various nodes on the aircraft, such as the Router and Air-To-Ground Modem, are assigned IP addresses in the IPx.* range, where the IPx.* IP addresses are private, locally unique, static IP addresses. The Router is the Level 3 Tunnel endpoint on the aircraft, identified by a IPw.* IP address and encapsulates each packet to be transmitted to the ground in a new IP packet, with IPx.* as the source address. The IPw.* IP addresses are private, globally unique, static IP addresses assigned by the Packet Data Serving Node (PDSN). The destination address is the Level 3 Tunnel endpoint located on the ground. The Packet Data Serving Node (PDSN) sees only a single IP address per aircraft as is expected. The Level 3 Tunnel endpoint on the ground strips off the outer IP/Tunnel header from the received packets and recovers the IPy.* source addresses.

NAT IP Tunnel

FIG. 6 illustrates, in block diagram form, the architecture of the Aircraft Air-To-Ground IP Tunnel System using a NAT IP Tunnel. In computer networking, Network Address Translation (NAT, also known as Network Masquerading, Native Address Translation or IP Masquerading) is a technique of transceiving network traffic through a router that involves re-writing the source and/or destination IP addresses and usually also the TCP/UDP port numbers of IP packets as they pass through. Checksums (both IP and TCP/UDP) must also be rewritten to take account of the changes. Most systems using NAT do so in order to enable multiple hosts on a private network to access the Internet using a single public IP address (see gateway). Many network administrators find NAT a convenient technique and use it widely. Nonetheless, NAT can introduce complications in communication between hosts and may have a performance impact.

The passenger wireless devices are assigned IP addresses IPy.z.* which are private, globally unique, dynamic IP addresses for the passenger wireless devices located in a particular aircraft (z). The various nodes on the aircraft, such as the Router and Air-To-Ground Modem, are assigned IP addresses in the IPx.* range, where the IPx.* IP addresses are private, locally unique, static IP addresses. The Air-To-Ground Modem is the NAT Tunnel endpoint on the aircraft, identified by a IPw.* IP address and the IPw.* IP addresses are private, globally unique, static IP addresses assigned by the Packet Data Serving Node (PDSN). For data packet traffic generated by the passenger wireless devices, the NAT on the aircraft uses a static NAPT to map the passenger wireless device IPy.z.* IP address to an IPw.x IP address and an ethereal source port (from a range of ports assigned to that aircraft) that is unique for the particular passenger wireless device IPy.z.* The data packet is then tunneled to the Air-To-Ground Modem over the IPx.* network and is then forwarded over the Air-To-Ground link to the Packet Data Serving Node (PDSN). The Packet Data Serving Node (PDSN) sees only a single IP address per aircraft as is expected and the NAT on the ground uses the same static NAPT mapping to convert IPw.x and source port from the aircraft back to the IPy IP address. The ethereal source port received from the aircraft remains the same.

In a typical configuration, a local network uses one of the designated "private" IP address subnets (the RFC 1918 Private Network Addresses are 192.168.x.x, 172.16.x.x through 172.31.x.x, and 10.x.x.x—using CIDR notation, 192.168/16, 172.16/12, and 10/8), and a router on that network has a private address (such as 192.168.0.1) in that address space. The router is also connected to the Internet with a single "public" address (known as "overloaded" NAT) or multiple "public" addresses assigned by an ISP. As traffic passes from the local network to the Internet, the source address in each packet is translated on the fly from the private addresses to the public address(es). The router tracks basic data about each active connection (particularly the destination address and port). When a reply returns to the router, it uses the connection tracking data it stored during the outbound phase to determine where on the internal network to forward the reply; the TCP or UDP client port numbers are used to demultiplex the packets in the case of overloaded NAT, or IP address and port number when multiple public addresses are available, on packet return. To a system on the Internet, the router itself appears to be the source/destination for this traffic.

For reverse traffic, the NAT IP Tunnel uses NAT (actually NAPT) on aircraft and performs a reverse NAT on ground. The range of ports used for NAPT would be unique for each user and static mapping of user IP address to port range would be known/used by the NAT on the aircraft and on the ground. This process allows user addresses (but not ports) to be recovered on the ground.

NAT IP Tunnel Example

Figure 7:
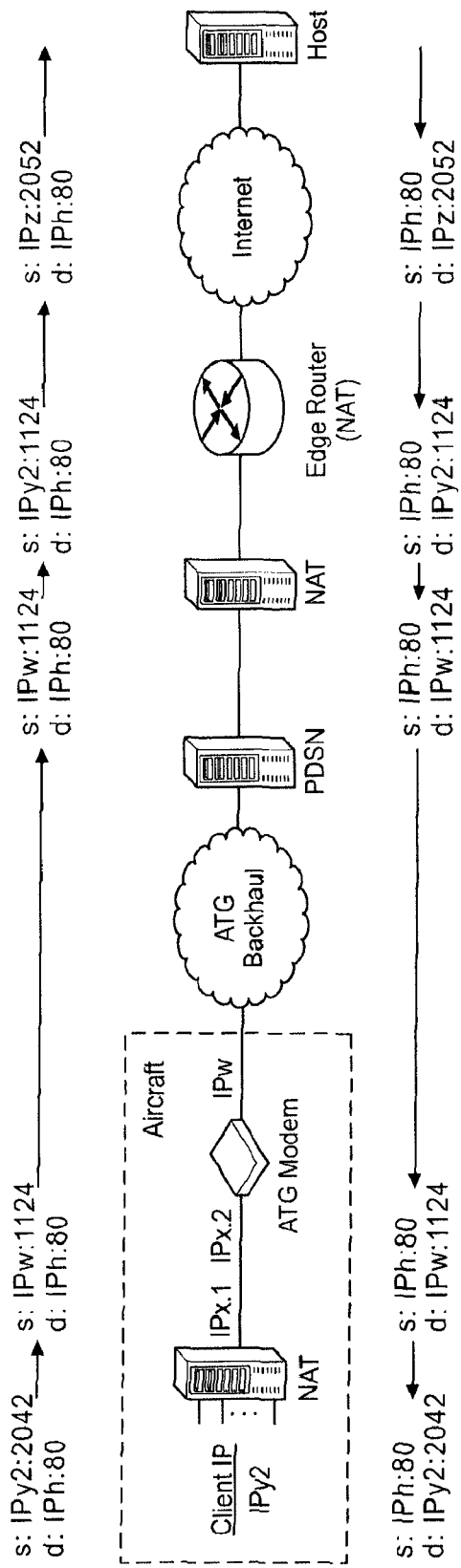
FIG. 7 illustrates, in signal flow diagram form, the typical operation of the Aircraft Air-To-Ground IP Tunnel System using a NAT IP Tunnel.
Figure 8:
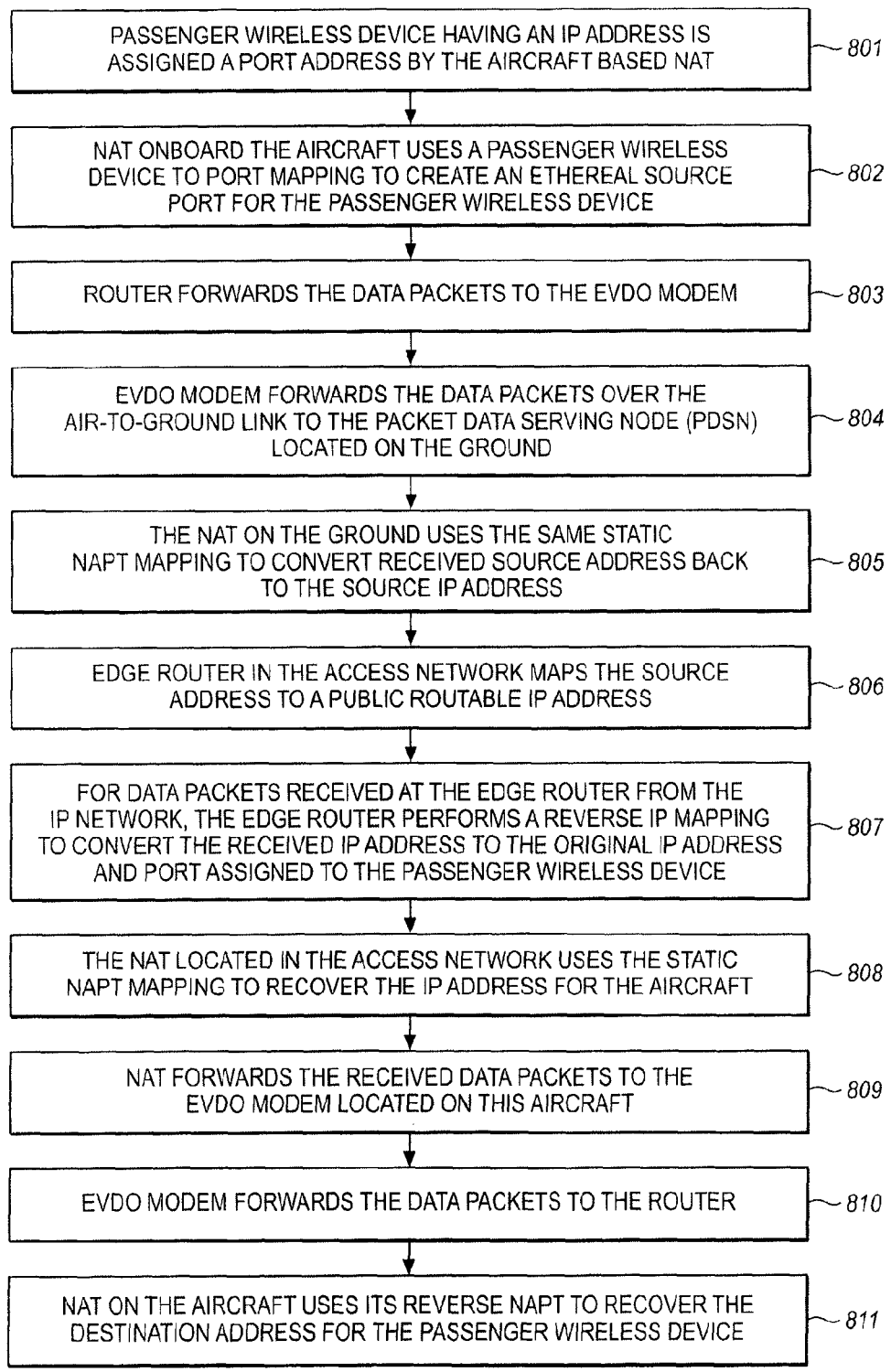
FIG. 8 illustrates, in flow diagram form, the typical operation of the Aircraft Air-To-Ground IP Tunnel System using a NAT IP Tunnel.

FIG. 7 illustrates, in signal flow diagram form, and FIG. 8 illustrates in flow diagram form, the typical operation of the Aircraft Air-To-Ground IP Tunnel System using a NAT IP Tunnel to exchange data with a specific destination. This example illustrates a selected passenger wireless device having an IP address of IPy.2 communicating with an end point (not shown) that has an IP address of IPh:80. The passenger wireless device is assigned a port address, such as 2042, at step 801 by the NAT located onboard the aircraft, which port address is appended to the passenger wireless device IP address to yield IPy2:2042, which is a private, globally unique, dynamic IP address for this passenger wireless device located in the particular aircraft (w). The NAT onboard the aircraft at step 802 therefore uses this passenger wireless device to port mapping to create an ethereal source port for the passenger wireless device IP address IPy.2. The source address, therefore, is IPy2:2042 and the destination address is IPh:80.

The Router is assigned an IP address of IPx.1 and the Air-To-Ground Modem is assigned an IP address of IPx.2, where these IPx.* addresses are private, locally unique, static IP addresses. The Air-To-Ground Modem is the NAT Tunnel endpoint on the aircraft, identified by a IPw.* IP address and the IPw.* IP addresses are private, globally unique, static IP addresses assigned by the Packet Data Serving Node (PDSN). For data packet traffic generated by the passenger wireless devices, the NAT on the aircraft uses a static NAPT to map the passenger wireless device IPy.z.* IP address to an IPw.x IP address and an ethereal source port (from a range of ports assigned to that aircraft) that is unique for the particular passenger wireless device IPy.z.* Thus, the Router selects an IP address assigned by the Packet Data Serving Node (PDSN) and assigns an IP address of IPw:1124 to this source passenger wireless device.

The data packet is then tunneled to the Air-To-Ground Modem by the Router at step 803 over the IPx.* network and is then forwarded at step 804 by the Air-To-Ground Modem over the Air-To-Ground link to the Packet Data Serving Node (PDSN) located on the ground. The Packet Data Serving Node (PDSN) sees only a single IP address per aircraft as is expected and the NAT on the ground uses the same static NAPT mapping at step 805 to convert IPw.x and source port from the aircraft back to the IPy IP address. The ethereal source port received from the aircraft remains the same. Thus, at the NAT, the source address for the passenger wireless device becomes IPy2:1124, since the source port address does not change. The Edge Router in the Access Network maps the source address to a public routable IP address IPz:2052 at step 806 and selects any available ethereal source port.

In the reverse direction, data packets received at the Edge Router from the IP Network from the destination (now termed source IPh:80 in this direction of the bidirectional communication connection) are directed at step 807 to destination IPz:2052 and the Edge Router performs a reverse IP mapping to convert the received IP address to the original IP address and port assigned to the passenger wireless device, to yield IPy2:1124. The NAT located in the Access Network uses the static NAPT mapping at step 808 to recover the IPw for the aircraft in which this passenger wireless device resides. The destination port remains the same and the IP address output by the NAT, therefore, is IPw:1124. The NAT located in the Access Network at step 809 forwards the received data packets to the Air-To-Ground Modem located onboard this aircraft. The received data packets are received at the Air-To-Ground Modem located on this aircraft are forwarded at step 810 to the Router, where the NAT on the aircraft at step 811 uses its reverse NAPT to recover the destination address IPy2 and port 2042 for the passenger wireless device.

In this manner, the address manipulation used in the aircraft and in the Access Network enables the Packet Data Serving Node (PDSN) to present unique IP addresses to the ground-based network for the plurality of passenger wireless devices located on the aircraft, yet use the standard common IP address for the Air-To-Ground link.

Summary

The Aircraft Air-To-Ground IP Tunnel System enables the assignment of individual Internet Protocol (IP) addresses to each of the passenger wireless devices, operating in an aircraft and served by an airborne wireless cellular network, thereby to enable delivery of wireless services to the individually identified passenger wireless devices.

What is claimed as new and desired to be protected by Letters Patent of the United States is:

1. A system for providing individual ground-based Access Network IP addresses to a plurality of passenger wireless devices which are located onboard an aircraft when said aircraft is in flight, comprising:
 aircraft network, located in an aircraft, for generating radio frequency communication signals to wirelessly communicate, in a bidirectional packet-switched mode, with a plurality of passenger wireless devices located in said aircraft;
 ground-based Access Network, having a single IP address, for exchanging communication signals with at least one ground-based packet-switched communication network;
 Air-To-Ground network for the bidirectional exchange of packet-switched radio frequency communications on a single physical communication link between said aircraft network and said ground-based Access Network when said aircraft is in flight;
 wherein said aircraft network comprises:
  IP address assignment for assigning a unique IP address on said aircraft network for each of said passenger wireless devices on the aircraft,
  data concentrator, located on said aircraft, for converting the subscriber packet data traffic received from said plurality of passenger wireless devices located in said aircraft to at least one packet-switched aggregate data stream;
 wherein said Air-To-Ground network comprises:
  IP Tunnel for supporting the unique IP addresses of the passenger wireless devices on said aircraft network in said bidirectional packet-switched radio frequency communications between said aircraft network and said ground-based Access Network when said aircraft is in flight, and
  data concentrator for converting the subscriber traffic and signaling channels received from said corresponding ground-based communications network to at least one aggregate data stream for transmission to said aircraft network via said IP Tunnel when said aircraft is in flight.

2. The system for providing individual ground-based Access Network IP addresses of claim 1 wherein said Air-To-Ground network further comprises:
 Layer 2 Tunneling Protocol for establishing a router-to-router Virtual Private Network (VPN) connection between the Packet Data Serving Node (PDSN) located in the ground-based Access Network and the Air-To-Ground modem located in the aircraft.

3. The system for providing individual ground-based Access Network IP addresses of claim 2 wherein said Layer 2 Tunneling Protocol comprises:
  Packet Data Serving Node (PDSN) functioning as the L2TP Access Concentrator (LAC) and Air-To-Ground modem acts as a L2TP Network Server (LNS).

4. The system for providing individual ground-based Access Network IP addresses of claim 1 wherein said Air-To-Ground network further comprises:
  Layer 3 Tunneling Protocol for terminates just before the Air-To-Ground Modem on the aircraft and NAT does not need to be performed on the aircraft. The other end of IP Tunnel terminates just after the Packet Data Serving Node (PDSN) on the ground.

5. The system for providing individual ground-based Access Network IP addresses of claim 1 wherein said Air-To-Ground network further comprises:
  aircraft-based NAT, located onboard the aircraft, for mapping the passenger wireless device IP address to an IP address and an ethereal source port that is unique for the particular passenger wireless device.

6. The system for providing individual ground-based Access Network IP addresses of claim 5 wherein said Air-To-Ground network further comprises:
  ground-based NAT for using the same static NAPT mapping of said aircraft-based NAT to convert IP addresses received from the aircraft back to the passenger wireless device IP address.

7. The system for providing individual ground-based Access Network IP addresses of claim 1 wherein said Air-To-Ground network further comprises:
  data disaggregation for disaggregating said at least one aggregate data stream into a plurality of data streams and delivering each of said plurality of data streams to a one of said plurality of passenger wireless devices located in said aircraft.

8. A method for providing individual ground-based Access Network IP addresses to a plurality of passenger wireless devices which are located onboard an aircraft, comprising:
  generating in an aircraft network, located in an aircraft, radio frequency communication signals to wirelessly communicate, in a bidirectional packet-switched mode, with a plurality of passenger wireless devices located in said aircraft;
  exchanging communication signals in a ground-based Access Network, having a single IP address, with at least one ground-based communication network; and
  bidirectionally exchanging packet-switched radio frequency communications on a single physical communication link in an Air-To-Ground network between said aircraft network and said ground-based Access Network when said aircraft is in flight;
  wherein said step of generating in an aircraft network comprises:
    assigning a unique IP address on said aircraft network for each of said passenger wireless devices on the aircraft,
    data concentrating on said aircraft, for converting the subscriber packet data traffic received from said plurality of passenger wireless devices located in said aircraft to at least one packet-switched aggregate data stream; and
  wherein said step of exchanging communication signals comprises:
    supporting, via an IP Tunnel, the unique IP addresses of the passenger wireless devices on said aircraft network in said bidirectional packet-switched radio frequency communications between said aircraft network and said ground-based Access Network when said aircraft is in flight, and
    converting the subscriber traffic and signaling channels received from said corresponding ground-based communications network to at least one aggregate data stream for transmission to said aircraft network via said IP Tunnel when said aircraft is in flight.

9. The method for providing individual ground-based Access Network IP addresses of claim 8 wherein said step of bidirectional exchanging packet-switched radio frequency communications in an Air-To-Ground network comprises:
  establishing in a Layer 2 Tunneling Protocol a router-to-router Virtual Private Network (VPN) connection between the Packet Data Serving Node (PDSN) located in the ground-based Access Network and the Air-To-Ground modem located in the aircraft.

10. The method for providing individual ground-based Access Network IP addresses of claim 9 wherein said step of establishing in a Layer 2 Tunneling Protocol comprises:
  using a Packet Data Serving Node (PDSN) as the L2TP Access Concentrator (LAC) and the Air-To-Ground modem as a L2TP Network Server (LNS).

11. The method for providing individual ground-based Access Network IP addresses of claim 8 wherein step of bidirectionally exchanging packet-switched radio frequency communications in an Air-To-Ground network further comprises:
  terminating a Layer 3 Tunneling Protocol just before the Air-To-Ground Modem on the aircraft and NAT does not need to be performed on the aircraft, and the other end of the IP Tunnel terminates just after the Packet Data Serving Node (PDSN) on the ground.

12. The method for providing individual ground-based Access Network IP addresses of claim 8 wherein step of bidirectionally exchanging packet-switched radio frequency communications in an Air-To-Ground network further comprises:
  mapping, onboard the aircraft, the passenger wireless device IP address to an IP address and an ethereal source port that is unique for the particular passenger wireless device.

13. The method for providing individual ground-based Access Network IP addresses of claim 8 wherein step of bidirectionally exchanging packet switched radio frequency communications in an Air-To-Ground network further comprises:
  using in a ground-based NAT the same static NAPT mapping as said step of mapping, onboard the aircraft, to convert IP addresses received from the aircraft back to the passenger wireless device IP address.

14. The method for providing individual ground-based Access Network IP addresses of claim 8 wherein step of bidirectionally exchanging packet-switched radio frequency communications in an Air-To-Ground network further comprises:
  converting the subscriber traffic and signaling channels received from said corresponding ground-based communications network to at least one aggregate data stream; and
  disaggregating said at least one aggregate data stream into a plurality of data streams and delivering each of said plurality of data streams to a one of said plurality of passenger wireless devices located in said aircraft.

* * * * *